United States Patent
Rust

(10) Patent No.: US 10,112,320 B2
(45) Date of Patent: Oct. 30, 2018

(54) PROCESS FOR THE EXTRUSION OF PLASTICS TENDING TO ADHERENCE

(71) Applicant: Harald Rust, Bochum (DE)

(72) Inventor: Harald Rust, Bochum (DE)

(73) Assignee: Entex Rust & Mitschke GmbH, Bochum (DE)

( * ) Notice: Subject to any disclaimer, the term of this patent is extended or adjusted under 35 U.S.C. 154(b) by 505 days.

(21) Appl. No.: 14/681,335

(22) Filed: Apr. 8, 2015

(65) Prior Publication Data

US 2015/0283728 A1 Oct. 8, 2015

Related U.S. Application Data

(63) Continuation-in-part of application No. PCT/EP2013/000132, filed on Jan. 17, 2013.

(30) Foreign Application Priority Data

Oct. 11, 2012 (DE) .......................... 10 2012 019 727

(51) Int. Cl.
*B29B 7/42* (2006.01)
*B29C 47/00* (2006.01)
*B29C 47/10* (2006.01)
*B29C 47/42* (2006.01)
*B29C 47/60* (2006.01)
*B29C 47/08* (2006.01)
*B29C 47/78* (2006.01)

(52) U.S. Cl.
CPC .............. *B29B 7/422* (2013.01); *B29B 7/421* (2013.01); *B29C 47/0007* (2013.01); *B29C 47/10* (2013.01); *B29C 47/42* (2013.01); *B29C 47/6043* (2013.01); *B29C 47/6075* (2013.01); *B29C 47/0855* (2013.01); *B29C 47/784* (2013.01)

(58) Field of Classification Search
CPC ... B29B 7/422; B29C 47/6075; B29C 47/585; B29C 47/663; B29C 47/665; B29C 47/666
See application file for complete search history.

(56) References Cited

U.S. PATENT DOCUMENTS

| | | |
|---|---|---|
| 3,233,025 A | 2/1966 | Frye et al. |
| 4,176,967 A | 2/1979 | Brinkmann et al. |
| 4,268,176 A | 5/1981 | Muller |
| 4,555,366 A | 11/1985 | Rodgers et al. |
| 4,981,711 A | 1/1991 | Kearns et al. |
| 5,045,325 A | 9/1991 | Lesko et al. |
| 5,108,711 A * | 4/1992 | Chszaniecki ............ B01F 7/30 159/2.2 |
| 5,135,760 A | 8/1992 | Degady et al. |
| 5,536,462 A | 7/1996 | Hawrylko |

(Continued)

FOREIGN PATENT DOCUMENTS

| | | |
|---|---|---|
| CA | 698518 A | 11/1964 |
| DE | 235613 | 12/1909 |

(Continued)

*Primary Examiner* — Tony G Soohoo
*Assistant Examiner* — Elizabeth Insler
(74) *Attorney, Agent, or Firm* — Smartpat PLC

(57) ABSTRACT

A process for the extrusion of plastics, such as plastics that tend to adhere or stick to parts of an extruder, using a planetary roller extruder in the feed part.

23 Claims, 13 Drawing Sheets

(56) References Cited

U.S. PATENT DOCUMENTS

| | | | |
|---|---|---|---|
| 5,947,593 A | 9/1999 | Inoue et al. | |
| 6,179,458 B1 | 1/2001 | Albers et al. | |
| 6,780,271 B1 | 8/2004 | Burmeister et al. | |
| 7,476,416 B2 * | 1/2009 | Tynan, Jr. | B01F 7/145 427/177 |

FOREIGN PATENT DOCUMENTS

| | | |
|---|---|---|
| DE | 1954214 A1 | 5/1971 |
| DE | 2059570 | 6/1971 |
| DE | 1964834 A1 | 7/1971 |
| DE | 2303366 | 7/1974 |
| DE | 2447368 A1 | 4/1976 |
| DE | 2702390 A1 | 7/1978 |
| DE | 2719095 | 11/1978 |
| DE | 141975 A3 | 6/1980 |
| DE | 8812244 U1 | 2/1989 |
| DE | 3937612 A1 | 8/1990 |
| DE | 3908415 A1 | 9/1990 |
| DE | 4111217 | 7/1992 |
| DE | 19508125 C1 | 2/1996 |
| DE | 69207369 T2 | 6/1996 |
| DE | 19534239 | 3/1997 |
| DE | 19548136 | 6/1997 |
| DE | 19548136 A1 | 6/1997 |
| DE | 69306874 T2 | 7/1997 |
| DE | 69312246 T2 | 1/1998 |
| DE | 69312852 T2 | 1/1998 |
| DE | 68915788 T2 | 2/1998 |
| DE | 19638094 | 3/1998 |
| DE | 19638094 A1 | 3/1998 |
| DE | 3738335 A1 | 5/1998 |
| DE | 19749443 | 5/1998 |
| DE | 19653790 A1 | 6/1998 |
| DE | 68928567 T2 | 8/1998 |
| DE | 19726415 A1 | 12/1998 |
| DE | 19730854 | 1/1999 |
| DE | 19806609 | 8/1999 |
| DE | 69419146 T2 | 10/1999 |
| DE | 19819349 | 11/1999 |
| DE | 19856235 A1 | 5/2000 |
| DE | 20003297 U1 | 7/2000 |
| DE | 19930970 A1 | 11/2000 |
| DE | 19939073 | 2/2001 |
| DE | 19939074 | 2/2001 |
| DE | 19939075 A1 | 2/2001 |
| DE | 19939076 | 2/2001 |
| DE | 19939077 A1 | 2/2001 |
| DE | 19939078 | 2/2001 |
| DE | 19953793 A1 | 5/2001 |
| DE | 19953796 A1 | 5/2001 |
| DE | 19954313 A1 | 5/2001 |
| DE | 19956483 A1 | 6/2001 |
| DE | 19956802 A1 | 6/2001 |
| DE | 19956803 A1 | 6/2001 |
| DE | 19958398 A1 | 6/2001 |
| DE | 19960494 A1 | 6/2001 |
| DE | 19962859 A1 | 7/2001 |
| DE | 19962883 A1 | 7/2001 |
| DE | 19962886 A1 | 7/2001 |
| DE | 10036705 | 3/2002 |
| DE | 10036706 | 3/2002 |
| DE | 10036707 | 4/2002 |
| DE | 10050295 | 4/2002 |
| DE | 69427539 T2 | 4/2002 |
| DE | 69709015 T2 | 5/2002 |
| DE | 69428309 T2 | 7/2002 |
| DE | 69707763 T2 | 8/2002 |
| DE | 10059875 | 10/2002 |
| DE | 69711597 T2 | 10/2002 |
| DE | 69710878 T2 | 11/2002 |
| DE | 69807708 T2 | 1/2003 |
| DE | 10142890 A1 | 3/2003 |
| DE | 69622375 T2 | 3/2003 |
| DE | 69715082 T2 | 5/2003 |
| DE | 69715781 T2 | 8/2003 |
| DE | 69808332 | 8/2003 |
| DE | 10137620 | 9/2003 |
| DE | 69628188 T2 | 4/2004 |
| DE | 69725985 T2 | 5/2004 |
| DE | 69908565 T2 | 5/2004 |
| DE | 10257377 A1 | 7/2004 |
| DE | 10334363 A1 | 8/2004 |
| DE | 4308098 | 9/2004 |
| DE | 69630762 T2 | 9/2004 |
| DE | 10333927 | 2/2005 |
| DE | 10342822 | 4/2005 |
| DE | 10343964 | 4/2005 |
| DE | 10345043 | 4/2005 |
| DE | 10349144 | 5/2005 |
| DE | 10351463 | 6/2005 |
| DE | 10352430 | 6/2005 |
| DE | 10352431 | 6/2005 |
| DE | 10352432 | 6/2005 |
| DE | 10352439 | 6/2005 |
| DE | 10352440 | 6/2005 |
| DE | 10352444 | 6/2005 |
| DE | 10354379 | 6/2005 |
| DE | 10354546 A1 | 6/2005 |
| DE | 102004048440 A1 | 6/2005 |
| DE | 102004048794 A1 | 6/2005 |
| DE | 10356821 A1 | 7/2005 |
| DE | 10 2004 005 058 | 8/2005 |
| DE | 60012108 T2 | 8/2005 |
| DE | 102004002159 A1 | 8/2005 |
| DE | 102004004230 A1 | 8/2005 |
| DE | 102004004237 A1 | 8/2005 |
| DE | 102004005005 A1 | 9/2005 |
| DE | 102005007952 A1 | 9/2005 |
| DE | 10 2004 026 799 | 12/2005 |
| DE | 102004023085 A1 | 12/2005 |
| DE | 69827497 T2 | 1/2006 |
| DE | 102004032694 A1 | 2/2006 |
| DE | 102004034039 A1 | 2/2006 |
| DE | 102004038774 A1 | 2/2006 |
| DE | 69829695 | 3/2006 |
| DE | 102004044085 A1 | 3/2006 |
| DE | 102004044086 A1 | 3/2006 |
| DE | 102004046228 A1 | 3/2006 |
| DE | 10340976 B4 | 4/2006 |
| DE | 10340977 B4 | 4/2006 |
| DE | 102004048773 A1 | 4/2006 |
| DE | 102004026799 B4 | 5/2006 |
| DE | 102004053929 A1 | 5/2006 |
| DE | 60206271 T2 | 6/2006 |
| DE | 102004060966 A1 | 6/2006 |
| DE | 102004061068 A1 | 7/2006 |
| DE | 102004061185 A1 | 7/2006 |
| DE | 60124269 T2 | 5/2007 |
| DE | 19720916 B4 | 7/2007 |
| DE | 102006033089 A1 | 10/2007 |
| DE | 102006054204 A1 | 5/2008 |
| DE | 102007041486 A1 | 5/2008 |
| DE | 69937111 | 6/2008 |
| DE | 102007059299 A1 | 11/2008 |
| DE | 102007049505 A1 | 4/2009 |
| DE | 102007050466 A1 | 4/2009 |
| DE | 102010000253 A1 | 7/2010 |
| DE | 102008058048 A1 | 8/2010 |
| DE | 102009060813 A1 | 7/2011 |
| DE | 102009060851 A1 | 7/2011 |
| DE | 102009060881 A1 | 7/2011 |
| DE | 102010026535 A1 | 1/2012 |
| EP | 0854178 A1 | 7/1998 |
| EP | 1056584 A1 | 12/2000 |
| EP | 1067352 A1 | 1/2001 |
| EP | 1078968 A1 | 2/2001 |
| EP | 1080865 | 3/2001 |
| EP | 1167017 | 1/2002 |
| EP | 1833101 | 7/2007 |
| EP | 1844917 | 10/2007 |
| EP | 2098354 A1 | 9/2009 |
| GB | 2175513 A | 12/1986 |

(56) References Cited

FOREIGN PATENT DOCUMENTS

| | | |
|---|---|---|
| JP | H 0317176 A | 1/1991 |
| JP | H 09326731 A | 12/1997 |
| JP | H 10235713 A | 9/1998 |
| JP | H 1180690 A | 3/1999 |
| JP | H 11216754 A | 8/1999 |
| JP | H 11216764 A | 8/1999 |
| JP | 2000026821 A | 1/2000 |
| WO | WO 9411175 A1 | 5/1994 |
| WO | WO 2004/037941 | 5/2004 |
| WO | WO 2004037941 A2 | 5/2004 |
| WO | WO 2004101626 A1 | 11/2004 |
| WO | WO 2004101627 A1 | 11/2004 |
| WO | WO 2007/087465 | 8/2007 |
| WO | WO 2007087446 A2 | 8/2007 |

\* cited by examiner

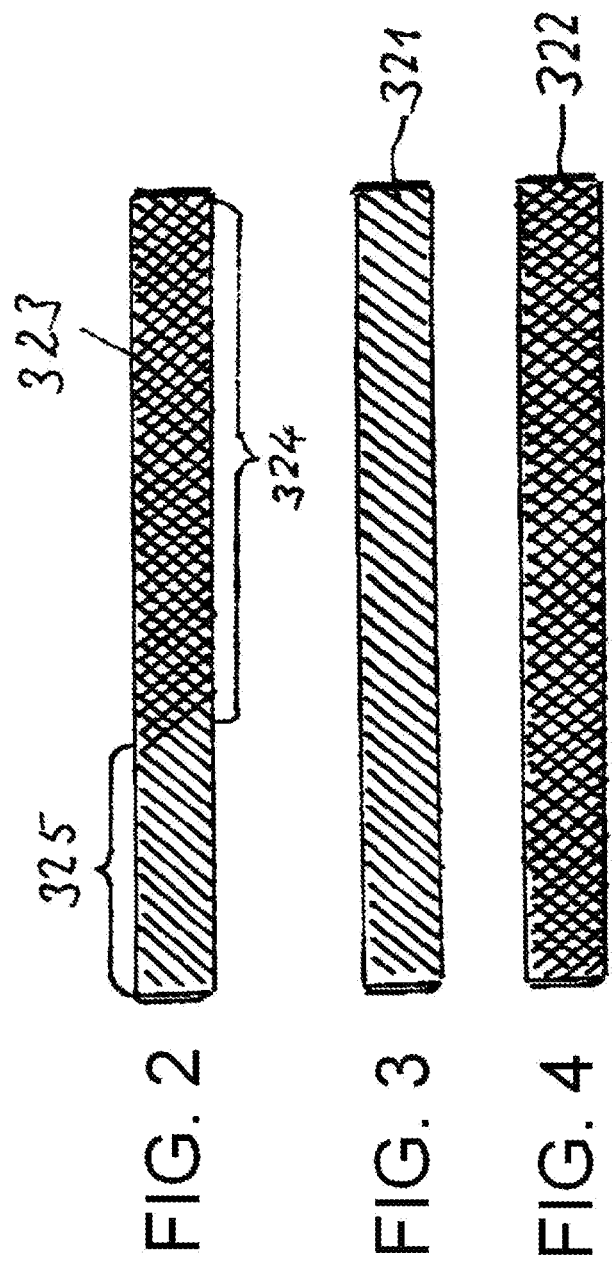

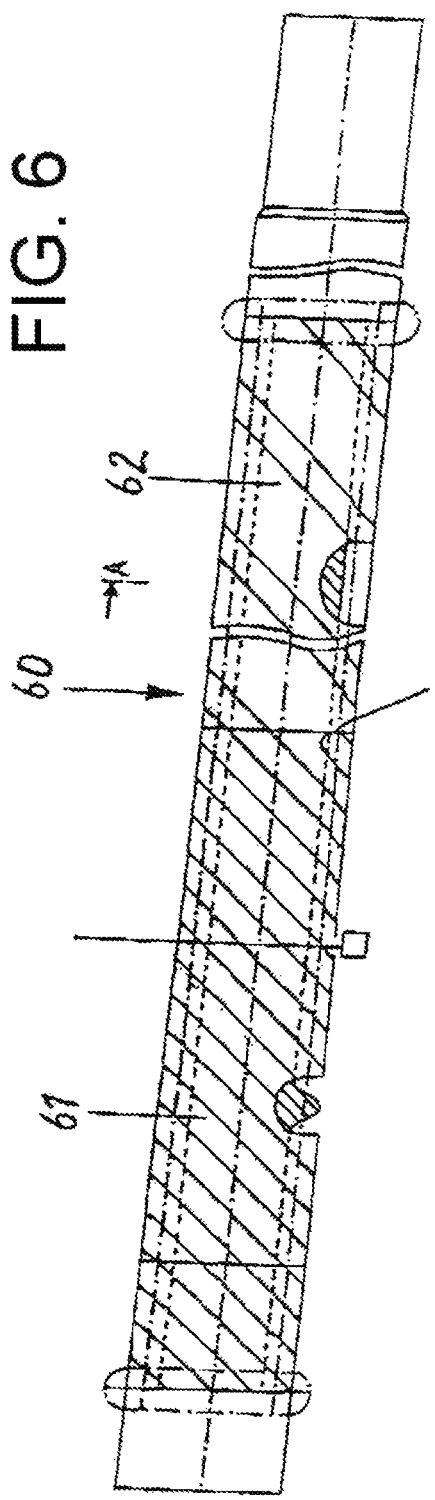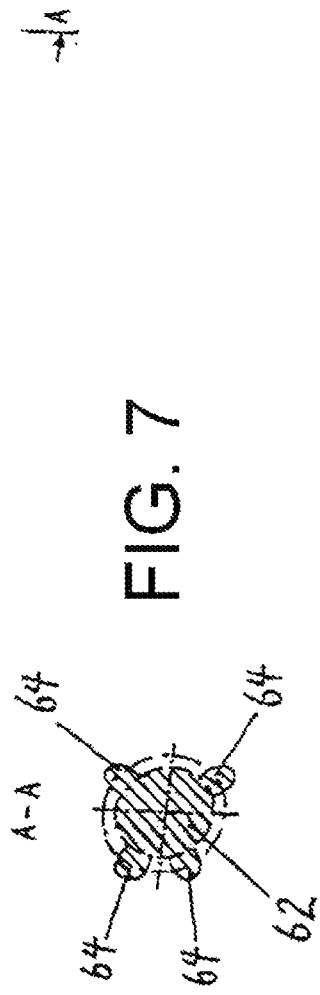

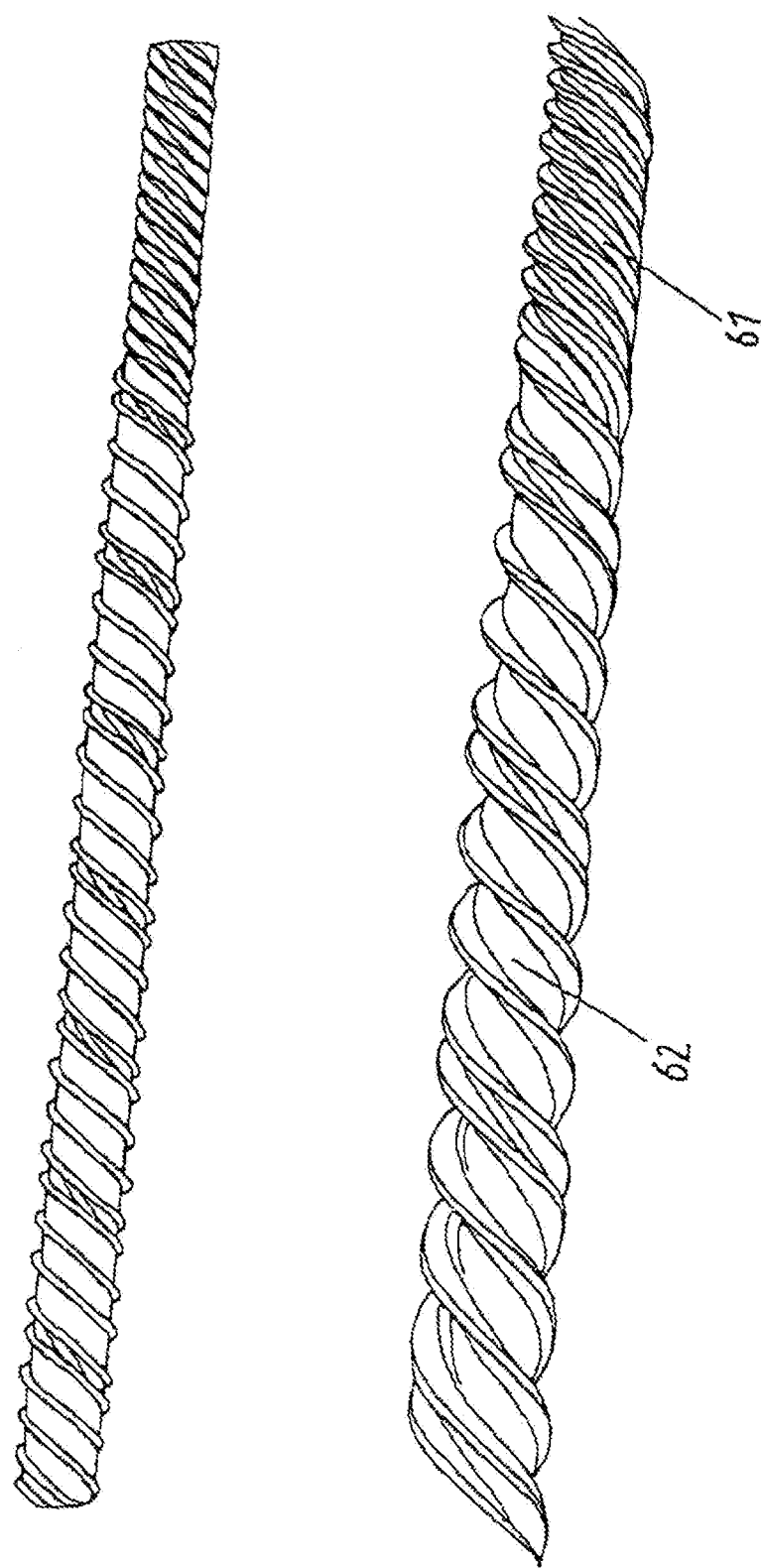

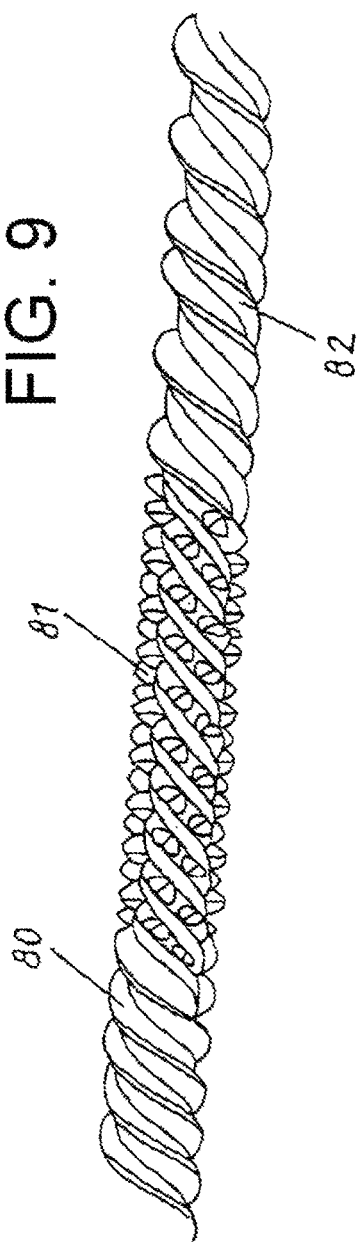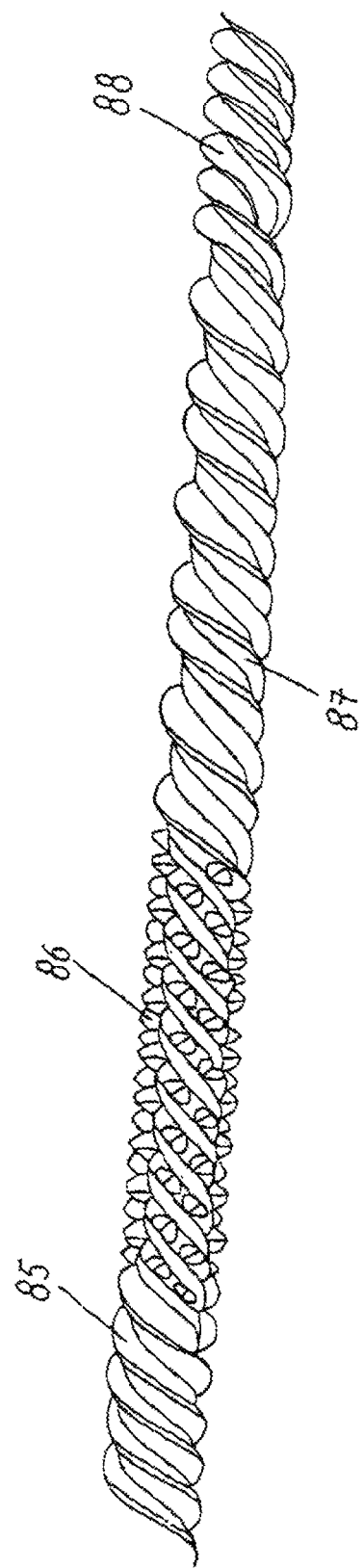

PROCESS FOR THE EXTRUSION OF PLASTICS TENDING TO ADHERENCE

CONTINUING APPLICATION DATA

This application is a Continuation-In-Part application of International Patent Application No. PCT/EP2013/000132, filed on Jan. 17, 2013, which claims priority from Federal Republic of Germany Patent Application No. 10 2012 019 727.6, filed on Oct. 11, 2012. International Patent Application No. PCT/EP2013/000132 was pending as of the filing date of this application. The United States was an elected state in International Patent Application No. PCT/EP2013/000132.

BACKGROUND

1. Technical Field

The present application relates to a process for the extrusion of plastics that tend to adhere to other objects or surfaces.

2. Background Information

Background information is for informational purposes only and does not necessarily admit that subsequently mentioned information and publications are prior art.

Extruders generally fit into one of the following main groups: single screw extruder, twin-screw extruders, planetary roller extruders.

Single-screw extruders comprise a rotating screw and a surrounding housing. With single-screw extruders, a high pressure build-up and a high feed effect can be achieved. However, the homogenization and the dispersion in the single-screw extruder are somewhat less. Anyhow, single-screw extruders are still the most widely used extruders.

Twin-screw extruders comprise two parallel or substantially parallel correlating and jointly cogging screws and a surrounding housing. With twin-screws as well a high pressure build-up and a high feed effect can be achieved. The mixing effect of the twin-screw extruder is by far higher than with a single-screw extruder. However, the plastics experience a more or less large change of their molecular chains due to the mechanical load in the twin-screw extruder. There exist applications at which this cannot be denied. For other applications, the maintenance of the molecular chains is important, for which applications the planetary roller extruder often will be suitable.

Planetary roller extruders comprise more parts, namely a rotating central spindle, a housing with an internal toothing, which surrounds the central spindle in a distance, and planetary spindles which rotate like planets around the central spindle in the hollow space between the central spindle and the internally toothed housing. As described in the following, an internal toothing of the housing can include also a multipart housing with a liner which forms the internal toothing of the housing. In the planetary roller extruder the planetary spindles are cogging or mesh with the central spindle as well as with the internal toothed housing.

Simultaneously or substantially simultaneously, the planetary spindles slide into a stop ring with the end pointing into conveying direction.

Compared with other extruder designs the planetary roller extruders have an extremely good mixing effect, but also a much lower feed effect.

For the continuous processing of plastics it is known since several decades to use the planetary roller extruder. Such processes and corresponding planetary roller extruders are known.

An extruder can be composed of several sections/modules, which can be planetary roller extruder sections/modules. In many instances, different sections/modules are used. For years it has proved to be favorable to combine planetary roller extruder sections/modules with sections/modules of another construction type. For example, planetary roller extruder sections/modules will be combined with a single-screw extruder section/module which is formed as feed part. Via the feed part the raw material for the extrusion will be taken off a feed hopper and pressed into the planetary roller extruder sections/modules. The use of a planetary roller extruder section/module as a feed part proved to be unsuitable because the material leaving the hopper downwards would be pressed or pushed back out of the feed part by contact with the rotating planetary spindles.

In order to supply liquid blowing agents or other liquid materials into the planetary roller extruder sections/modules, it has been proved to inject these liquids into the line via injection rings which are arranged between two planetary roller extruder sections/modules in each case.

It is also known to supply the melt directly via a side-arm extruder or a pump into a planetary roller extruder section/module.

The details and variations of known planetary roller extruders and sections/modules respectively are known.

Besides plastic materials, diverse other materials can also be used for the extrusion, such as fillers, dyestuffs, softeners, stabilizers and other auxiliary materials and additives, respectively. Not all materials or most materials slide well through the extruder. Some materials tend to inherently adhere to the extruder or, after reaction with other materials, tend to stick in the extruder. In order to avoid, restrict, or minimize or to reduce the adherence and sticking, it is known to add anti-seize or anti-stick agents to the extrusion material. However, there exists a multitude of plastics for which anti-seize agents are not suitable. This is valid for adhesives, even in case the adhesive shall be processed in the extruder. The compounding of adhesives by means of an extruder is known.

In addition, a process for the production of a high-self-adhesive mass is known for which planetary roller extruder sections are used. Thereby the raw materials will be supplied via a feed part which is designed as a single-screw extruder. This corresponds to the conventional supply of raw materials. However, there is also a concept that the raw materials could be supplied directly between the central spindle and the planetary spindles. At this location the material supply is so difficult that a realization of this proposal is not possible without knowing further details.

Some extruders comprise planetary roller extruder sections. Raw materials in form of granulate with appropriate additions for the production of powder coatings can be supplied by means of a hopper directly through the housing shell into a planetary roller part.

As far as the plastics compounded in the extruder are compatible to anti-seize agents, the anti-seize agent has asserted itself.

OBJECT OR OBJECTS

Anyhow, the present application has tackled the task to reduce the use of anti-seize or anti-stick agents. Furthermore, the present application has set the objective to operate totally or substantially totally without anti-seize agents so that also materials being incompatible to anti-seize agents can be better processed in an extruder.

SUMMARY

The present application acts on the understanding that the danger of adherence and sticking at the screw of the feed part is much higher than at the parts of the planetary roller extruder sections/modules. The present application traces this back to the fact that the planetary roller extruder sections/modules have a much higher self-cleaning effect than a single-screw feed part.

Therefore, the present application has set the objective to develop another material supply than the feed part with a single screw. The present application looks to the earlier tests with a planetary roller extruder section/module designed as a feed part with material feed. According to the present application, a feed part will be generated wherein the planetary spindles are at least partly designed as transport spindles in the zone of the inlet opening. The design allows in one possible embodiment (apart from the filling level of the raw material in the feed hopper being arranged above the feed opening) a non-pressurized entering or feeding of the raw material into the feed opening.

In addition, the design of the feed part as per the present application is also possible in case the feed part is equipped with a stuffing screw/stuffing device.

Stuffing screws/stuffing devices are described in diverse publications also in combination with an extruder, and also in combination with planetary roller extruders.

The stuffing screw/stuffing device is used if the raw material destined for the extruder does not feed itself—due to its weight—out of the feed hopper of the feed part and enter into the inlet opening. This is for example the case for fibers which shall be mixed with plastic, wherein the stuffing screw/stuffing device forces the raw material into the inlet opening of the extruder.

By using a stuffing screw, the resistance of raw materials to the feeding by means of the design according to the present application will be considerably reduced.

Incidentally a special inlet zone at the internal side of the housing of the planetary roller extruder section/module is possible according to one possible embodiment.

The inlet zone is the annular surface at the housing shell of the planetary roller extruder section/module in which the opening for the material supply is located, plus/minus an alteration of the width of the annular surface of fifty percent, in one possible embodiment plus/minus thirty percent, in a further embodiment plus/minus ten percent, whereat the alteration of the width of the annular surface—based on the middle of the annular surface—is evenly spread to both halves of the annular surface which are located on both sides of the middle of the annular surface.

At the planetary roller extruder sections/modules as per the present application which are used as feed parts, the feed effect of the transport spindles can still be completed by a flattening or shortening of the internal toothing of the housing. But the flattening has also possibilities independent of the use of planetary spindles, which are designed at least partly as transport spindles.

The flattening takes place in the area following from the inlet opening in the direction of rotation of the central spindle. Since there is sufficient stability of the planetary spindles, the partly omitted support of the planetary spindles caused by the flattening has no effect on the planetary spindles. The planetary spindles are at their ends sufficiently held between the central spindle and the internal toothing of the housing because the internal toothing of the housing in those areas possesses full-size teeth.

The customary planetary spindles will absorb readily the additional bending load of the planetary spindles resulting from the omitted support.

In principle, the flattening in the direction of rotation of the central spindle can continue evenly. In one possible embodiment, however, it is intended that the flattening in the direction of rotation of the central spindle decreases, which results in a funnel-shaped enlargement of the hollow space between the internal toothing of the housing and the central spindle. The enlargement reduces the resistance of the raw material during its feeding into the extruder. The funnel shape leads or guides the raw material in a possible manner between the planetary roller parts of the feed part.

Some teeth can be flattened all the way to the ground or base of the tooth. In one possible embodiment, a reduction of the tooth height is carried out by a maximum of ninety percent of the original or standard height, and in a further embodiment by a maximum of eighty percent.

In spite of the flattening, raw material, which reaches the space of the previous tooth spaces, will still be displaced by the teeth of the rotating planetary spindles. In order to simultaneously or substantially simultaneously avoid and/or minimize disposals of raw material on the flattenings, the flattened teeth, in one possible embodiment, can be furnished with less inclined tooth flanks so that there can arise new teeth with a rounded new tooth point so that the raw material displaced out of the previous tooth ground pushes away raw material adhering at the new tooth flanks.

Such changes to the teeth can be produced by, among other devices, electrically operated erosion devices, wherein the tooth is worked with an electrode which is adapted to the requested new flattened tooth shape and which is dipped with the housing into an erosion bath. Thereby the electrode is brought close to the toothing to be flattened and the item will be admitted with current so that the molecules scale off the surface of the toothing to be flattened and march to the electrode. With increasing deformation of the toothing to be flattened the electrode is made to follow up so that a requested, short distance will be kept.

The described space enlargement by the flattening of the internal toothing of the housing depends on the fact to which degree the flattening reaches in the direction of rotation of the central spindle, and to which degree the flattening reaches in the axial direction of the central spindle.

In one possible embodiment of the present application, the degree of the flattening amounts to a minimum of one-tenth, in a further embodiment to a minimum of one-fifth, and in yet another embodiment to a minimum of one-half of the circumference of the pitch circle of the internal toothing of the housing.

The extension of the flattening in axial direction of the central spindle is named width. The width is at the utmost thirty percent larger or smaller than the opening width of the inlet opening, in one possible embodiment at the utmost twenty percent larger or smaller than the opening width of the inlet opening and in yet another embodiment at the utmost ten percent larger or smaller than the opening width of the inlet opening. In one possible embodiment, the width of the flattening will be equal to the opening width of the inlet opening.

The so-called transport spindles can be formed by removing at least one tooth from at least one conventionally toothed planetary spindle. Optionally also more teeth will be removed. In one possible embodiment, remain at least in each case three evenly spread at the circumference of the planetary spindles. Also every fourth or third or every second tooth can be removed. Also all or most teeth except one can be removed. If there is more than one tooth remaining, then the teeth are spread evenly about the circumference of the spindles.

Thus, a reduced tooth trimming occurs in contrast to non-reduced tooth trimming. The removal of the teeth occurs in one possible embodiment all the way to the tooth ground. It is also possible to form longer teeth, or to partly remove portions of the teeth.

Alternatively, the transport spindles are produced just from the beginning in such a way that the transport spindles have a shape that corresponds to a standard spindle if individual or several teeth had been removed from the standard spindle.

Due to the total or partial removal of specified teeth while leaving the remaining teeth unchanged, a planetary spindle is formed that has a greater feed effect.

It appeared that the transport spindles, contrary to other planetary spindles, would catch or draw very well the material coming out of a feed hopper into the planetary roller extruder section/module.

The number of the remaining teeth of the transport spindles amounts to optionally a maximum of four, in one possible embodiment three, in a further embodiment two and in yet another embodiment one.

The "total or partly" design of the planetary spindles as transport spindles means that:

a) planetary spindles outside of the zone of the inlet opening are equipped with another toothing, and/or b) transport spindles in the zone of the inlet opening are combined with planetary spindles with another toothing.

Another toothing means for example: conventional toothing or hedgehog toothing (transversal mixing planetary spindles) or nap spindles. The hedgehog toothing and/or the nap toothing are intended to be located at the planetary roller extruder section/module in the conveying direction.

The known hedgehog toothing arises in one possible embodiment out of a conventional toothing by incorporating in axial distances annular slots into the planetary spindles. Thereby the annular slots are chosen such that the teeth will taper at the end like an oscillation (similar to a sinusoidal oscillation) and rise at the beginning like an oscillation, whereat the teeth run over immediately or substantially immediately from the beginning to the end, thus resulting in round teeth.

The nap toothing occurs in one possible embodiment out of the conventional toothing. The conventional toothing of planetary spindles is marked on the one hand by a cross section as it is shown by the intermeshing teeth of the toothed wheels of a gear. On the other hand the teeth do not continue straight but are spindle-shaped or like flights of a screw thread along the circumference.

Also in this shape the flights are cut, e.g. lathed or milled, into the basic raw material of the planetary spindles.

Concerning the threads, they are differentiated between left-handed thread and right-handed thread. There also exist multiple threads.

The same distinction takes place at extruder spindles.

A nap toothing occurs for example if a left-handed continuing slot, similar to a thread, is incorporated into a right-handed toothing. By inclusion of the slot, the threads of the planetary spindles will be interrupted. The slot can have the same or another (minor or major) inclination than the toothing of the spindles. The inclination of the slot differs in one possible embodiment by a maximum of fifty percent from the inclination of the toothing.

It is possible that the planetary spindles have a conventional toothing at the end pointing into the conveying direction outside of the inlet section. There the higher conveying effect of the conventional toothing can be used in order to avoid or minimize that the incoming raw material is spread contrary to the conveying direction. However, a conventional toothing can also be utilized at the planetary roller extruder section/module in the conveying direction outside of the inlet section. As stated above under b) planetary spindles, designed as transport spindles, of a planetary roller extruder section/module serving as a feed part can be combined with differently designed planetary spindles. This means that the planetary spindle trimming (entirety of planetary spindles) of a planetary roller extruder section/module serving as the feed part can optionally also comprise differently toothed planetary spindles. In one possible embodiment, the portion of planetary spindles with transport spindle toothing amounts to a minimum of fifty percent, in another possible embodiment a minimum of seventy percent, and in yet another possible embodiment a minimum of ninety percent of the spindle trimming.

In the event of partial use of transport spindles for the spindle trimming, the planetary spindles with transport spindle toothing are in one possible embodiment evenly spread in the planetary spindle trimming.

For a planetary spindle trimming which is equipped totally or substantially totally with transport spindles, the number of the teeth at the transport spindles is chosen such that, within a minimum of ten rotations of the planetary spindles around the central spindle, one planetary spindle tooth meshes with every tooth space of the toothing of the central spindle and with every tooth space of the internal toothing of the surrounding housing. In one possible embodiment, this tooth mesh takes place within a minimum of seven rotations of the planetary spindles around the central spindle, in another possible embodiment within a minimum of four rotations of the planetary spindles around the central spindle and in yet another embodiment within a minimum of one rotation of the planetary spindles around the central spindle. The tooth mesh effects a cleaning of the toothing.

The tooth mesh can be controlled or configured by testing. For example, a colored material that is molten at room temperature, and has sufficient adherence at the planetary spindles, central spindle and internal toothing of the housing, will be filled into their tooth spaces. It can then be determined after how many rotations of the planetary spindles around the central spindle a requested tooth mesh took place. This happens for example after one rotation or four rotations or seven rotations or ten rotations of the planetary spindles around the central spindle, and can be checked by opening of the feed part as per the present application.

During use, the rotation of the planetary spindles around the central spindle is in a fixed relationship to the rotation of the central spindle. For the above mentioned control/configuration, the central spindle of the feed part can be turned easily by hand in case the feed part is loosened from the remaining extruder sections/modules. Thereby the movement of the central spindle can be simulated with a sample specimen of the central spindle. In case the requested tooth mesh cannot be achieved within the required or desired number of rotations of the planetary spindles around the central spindle, the planetary spindles can be changed with other planetary spindles or additional planetary spindles can be applied. The other planetary spindles can have as transport spindles more teeth and/or differently arranged teeth. Optionally it will be sufficient to change one transport spindle with a conventionally toothed planetary spindle in order to secure that at each rotation of the planets a mesh into every tooth space at the central spindle and at the internally toothed housing takes place.

In contrast to the feed part as per the present application, a common feed screw, such as a single screw, in a feed part has no comparable cleaning effect. The screw is dependent on the fact that oncoming raw material will push out the proceeding material. This is hardly sufficient to control build up of material. The raw material flows where the least resistance arises. It cannot be ensured or essentially ensured that in the whole passage space, which is left open by the screw, the same resistances will occur. Already the least sticking/adherence can strongly influence the flow behavior in a negative manner. Without action of the operators a cleaning hardly can take place. In a planetary roller extruder, however, a cleaning compulsorily takes place due to the respective tooth mesh. This can be referred to as self-cleaning.

For the processing of different plastics, the heating-cooling of the feed part is possible. In fact, a heating-cooling of the feed screw at conventional feed parts is known, however, the heating-cooling of the known feed parts starts behind the inlet opening in conveying direction.

As per the present application the heating-cooling starts already at the inlet opening.

In one possible embodiment, the feed part as per the present application is sectioned into at least two heating-cooling sections and/or of short length. The short length refers to the length of the feed part behind the feed opening. The short length is smaller or equal 0.5 D, whereat D is the diametrical pitch of the internal toothing of the housing.

At a length of the feed part of more than two D (e.g. three D or four D) in one possible embodiment a heating-cooling in section is destined at which the first heating-cooling section in the conveying direction has a length which is equal to the length of a short feed part (smaller or equal 0.5 D). Each heating-cooling section is equipped with flow guidance for the heating-cooling agents. The guidance for the heating-cooling agent is executed like at other known planetary roller extruder sections/modules. In these, heating-cooling channels can be mounted at the internal surface of the housing and/or at the outer surface of the liner before assembly of the liner which is supporting the internal toothing in the housing. The channels run like flights at the inner surface of the housing and/or at the outer surface of the liner which is located in the housing. At the one end of the flights the heating-cooling agent enters and at the other end it exits. The channels will be closed by the liner during its assembly. Borings in the housing shell lead to the heating-cooling channels. At the borings there are connected feed lines/discharge lines for the heating-cooling agent.

The heating-cooling medium mostly is water, often also oil. The heating-cooling agent comes from a heating-cooling aggregate which is located outside of the line, in which it is heated up to the requested temperature and is supplied to the appropriate heating-cooling section. In the heating-cooling section the heating-cooling agent—according to requirements—emits heat or absorbs heat. The emergent heating-cooling agent will be supplied to the heating-cooling aggregate standing outside of the line for reloading with heat or for cooling.

The feed part, designed as a planetary roller extruder section/module as per the present application, has in one possible embodiment a housing ranging over the whole length of the feed part with an above-described liner and incorporated cooling channels. Thereby the cooling channels can proceed continuously from one end of the housing to the other end of the housing in order to facilitate the production. Before mounting the liner, the ends of the channels can be closed by means of rings which are located in corresponding borings of the ends of the housing. For disconnection of the whole cooling track into several sections, plugs can be inserted in every channel between two sections each before insertion of the liner. The above-described borings lead to the channels for the heating-cooling agent. Thereby, there are those boring which lead to the end of each channel, and the other borings to the beginning of each channel.

The application of the feed parts as per the present application offers possibilities for several materials, such as, among other things, elastomers, polyurethanes, adhesives, and chewing gums.

The elastomers and comparable materials may be of importance in economy and engineering. In any case, where plastics shall experience a strong deformation and return to the original shape after a load relief, it is reflected on elastomers and the like rubber elastic plastics (caoutchouc). Plastics comprise large molecular chains. The high elasticity of the elastomers is given by a phenomenon regarding the behavior of the molecular chains. At a tensile load of the molecular chains lying originally in a clew, the molecular chains organize themselves differently, in one possible embodiment parallel or substantially parallel with the molecular chains expanding.

For the required and/or desired deformation, however, it is a precondition that the molecular chains do not glide against each other. This is achieved by a cross-linking of the molecular chains. The deformation will be influenced by the degree of cross-linking. A soft plastic occurs at a minor or weak cross-linking. At an intense or strong cross-linking, a hard plastic generates.

Different cross-linking agents exist. Depending on the type of the plastic, a selection of the cross-linking agents takes place. Sulphur belongs to the often applied cross-linking agents. At appropriate heating of the plastic, sulphur comes into effect as the cross-linking agent. For other cross-linking agents it does not depend on the heat effect, or the effect of the cross-linking agent can depend on other circumstances.

To the elastomers belong for example:
Acrylonitrile-butadiene-rubber (NBR)
Acrylonitrile/butadiene/acrylate (A/B/A)
Acrylonitrile/chlorinated polyethylene/styrol (A/PE-C/S
Acrylonitrile/methyl Methacrylate (A/MMA)
Butadiene rubber (BR)
Butyl rubber (HR) (IIR)
Chloroprene rubber (CR)
Ethylene-ethyl acrylate-copolymer (E/EA)
Ethylene-propylene-copolymer (EPM)
Ethylene-propylene-diene rubber (EPDM)
Ethylene vinyl acetate (EVA)
Fluorrubber (FPM or FKM)
Isoprene rubber (IR)
Natural rubber (NR)
Polybutadiene rubber (BR)
Polyethylene resins
Polyisobutylene (PIB)
Polypropylene resins
Polyvinyl butyral (PVB)
Silicone rubber (Q or SIR)

Styrol isoprene styrol block copolymer (SIS)
Styrol butadiene rubber (SBR)
Styrol butadiene styrol (SBS)
Thermoplastic polyurethane (TPU or TPE-U)
Vinyl chloride/ethylene (VC/E)
Vinyl chloride/ethylene/methacrylate (VC/E/MA)

With regard to the elastomers, the danger of jamming and sticking is extremely great if cross-linking agents together with other material are fed via the feed part, which react to heating. Such elastomers are known. Then every jamming and sticking leads to unforeseen heating, to an unforeseen start of the cross-linking, and to a worse or poorer material property. By means of the feed part as per the present application, difficulties caused by jamming and sticking in the feed part can be avoided or minimized.

For polyurethanes, it depends on the combination of two reaction components in the correct relation. It is known to combine the reaction components by means of an extruder. Minor irregularities already can affect the blend. This as well can be avoided or minimized by means of the feed part as per the present application in the feed zone.

The processing of adhesives in the extruder is known.

By use of the feed part as per the present application the processing of adhesives in the extruder can be essentially facilitated.

The processing of chewing gum in the extruder is known. The heat sensitive rubber blend comprises lecithin, softeners, syrup, sugar, oils, flavors and elastomers. Thereunder are highly adhesive components tending to sticking. This production, as well, will be essentially facilitated by use of the feed part as per the present application.

The feed part as per the present application can be combined with other planetary roller extruder sections/modules. The essential part of the other planetary roller extruder sections are again the central spindle, rotating planetary spindles and an internally toothed housing as well as a stop ring for the planetary spindles. The function of these parts is the same as those depicted for planetary roller extruders. The planetary spindles can have a different design. In one possible embodiment the planetary spindles will have a conventional toothing and/or a hedgehog toothing and/or a nap toothing and/or a transport spindle toothing.

The standard toothing is an involute toothing. The involute (i.e., spiral) determines the shape of the tooth in the cross section. For the rest, the teeth proceed at the circumference of the planetary spindles like the thread teeth of the outer toothing of a thread bar.

The hedgehog toothing can be formed in the above described way from a conventional toothing, and likewise the nap toothing can be formed in the above described way from a conventional toothing. The conventional toothing, as well, can be formed in the above described way from a conventional toothing.

Thereby, different types of toothing (conventional, hedgehog, nap, transport) can be restricted to single planetary roller parts. The different types of toothing (conventional, hedgehog, nap, transport) can also be intended in several or in all planetary roller parts.

The different types of toothing (conventional, hedgehog, nap, transport) can be found together or in combination of two or three different types of toothing at the planetary spindles. The above variation of toothing can be applied to planetary spindles or to a part of the planetary spindles of a planetary extruder roller section/module. It is favorable to arrange the conventionally toothed part of the planetary spindles in the conveying direction of the extruder at the end (at the end of the discharging side of the planetary spindles/the end pointing in conveying direction) of the planetary spindles in order to set up there a supply pressure which facilitates the transfer of the granulate into the further extruder zone.

Optionally, toothed planetary spindles can alternate with differently toothed planetary spindles.

Optionally, individual toothed planetary spindles can be arranged between a multitude of differently toothed planetary spindles. Thereby it is favorable that at a minimum two equally toothed planetary spindles will be found in one planetary spindle trimming of a planetary roller extruder section/module which are equally spread in the trimming.

In case the nap toothing/hedgehog toothing is intended in several corresponding planetary roller parts (internal toothing of the housing, planetary spindles and central spindle) the nap toothing can be arranged in such a way that the interruptions of the toothing in one planetary roller part are aligned with the interruptions in the corresponding planetary roller part or are displaced in relation to these interruptions. The displacement can have a dimension being equal to a fraction of the tooth space between two teeth or a multiple of the tooth space between two teeth, whereat a multiple can also be a number smaller than two.

Due to the interruptions of the teeth, openings can occur into which the extrusion material can flow.

In one possible embodiment, the further planetary roller sections/modules have a length of a maximum of 1200 millimeters at a diameter up to 100 millimeters in the toothing of the planetary roller extruder housing, and in another embodiment of a maximum of millimeters. Other diameters of the toothing of the planetary roller extruder housing result in corresponding larger or smaller maximum lengths.

During extrusion in the extruder or rather in the extruder section energy will be discharged in a substantial extent which appears in the granulate as heat. If the granulate enters already with a considerable temperature into the planetary roller extruder or rather the planetary roller extruder section, it may become necessary and/or desired to lead away the occurred heat by means of cooling.

If the granulate does not have a sufficient temperature when entering the planetary roller extruder or rather the extruder section the cooling remains undone. If necessary and/or desired, heat will even be supplied.

For the heating and/or cooling, standard heating-cooling devices at planetary roller extruders will be sufficient. It is common practice to design the housing in a double-shell construction (as described above regarding the feed part as per the present application with housing and inside liner) and to guide the heating-cooling agent through the clear spacing. It is also common practice to equip the central spindle with channels through which heating-cooling agents are led as well. The conventional heating-cooling agent is water or oil with which it is heated or cooled.

The following may still be possible for the planetary spindles which are designed as transport spindles: The removal of the teeth can be executed later at existing planetary spindles. As far as a storage of planetary spindles takes place and as far as a tempering or hardening or other treatment for the increase of the wear resistance of the tooth surfaces is intended, the planetary spindles will be stored in one possible embodiment without surface treatment so that later an easy treatment as per the present application of the planetary spindles, e.g. by milling, will be possible. The treatment of the tooth surfaces will be executed after the machining.

Surprisingly, the removal of teeth does not affect the smooth running of the planetary spindles because the teeth are running like screws/flights at the surface of the planetary spindles. At sufficient length of the spindles and corresponding inclination, the helical or rather flight-shaped proceeding teeth clasp the spindles so often that the planetary spindles are safely guided and fixed between the central spindle and the surrounding housing. For example, according to one possible embodiment, a planetary spindle at which every second tooth has been removed can be formed, wherein:

a) at a planetary roller housing diameter (referred to the pitch diameter of the internal toothing of the housing) smaller 160 millimeters a processed minimum spindle length as per the present application of 200 millimeters, in one possible embodiment of minimum 300 millimeters and in another possible embodiment a spindle length of minimum 400 millimeters and a processed maximum length as per the present application of up to 1500 millimeters, in yet another possible embodiment up to 1200 millimeters and in still another possible embodiment up to 900 millimeters for a planetary spindle.

b) at a planetary roller housing diameter (referred to the pitch diameter of the internal toothing of the housing) of 160 millimeters and more a processed minimum spindle length as per the present application of 400 millimeters, in one possible embodiment of minimum 800 millimeters and in another possible embodiment a spindle length of min 1200 millimeters and a maximum spindle length of up to 3000 millimeters, in one possible embodiment up to 2500 millimeters and in another possible embodiment up to 2000 millimeters.

The above minimum spindle length refers to the toothing at the planetary spindle. The minimum spindle length, according to one possible embodiment, does not include the toothing which occurs at the above described running out of milling tools and/or at the running-in of the milling tool to specified milling depth, if the planetary spindle length is larger than the toothing length of the planetary spindle.

The processing (removal of teeth) of the planetary spindles can be applied to known tooth modules, to the usual modules one and one-half to twelve or in excess of these up to twenty. The tooth modules are to be distinguished from the above mentioned planetary roller parts/modules. The tooth modules mark the size of the teeth.

In one possible embodiment, the extruder sections/modules designed as planetary roller extruders are arranged in a stage of the extrusion line. Optionally also a multi-stage extrusion line can be concerned. At two stages one can speak of a tandem line with a primary extruder and a secondary extruder. At more stages one speaks of a cascade line. The multi-stage arrangement of an extrusion line will be used in order to execute a degassing of the extrusion material between the stages and/or to drive the individual stages independently of each other.

To an extrusion line belongs mostly also an extruder section intended at the end in which the extrusion material will be brought to outlet temperature.

The planetary roller sections/modules will be assembled with the other sections/modules to the respectively required and/or desired extruder. Thereby it is normal to intend one common central spindle for successively arranged modules of one stage of an extrusion line.

The modular construction is comparable with a building-block system and normally economical.

The different planetary parts (central spindle/planetary spindles/internal toothing) of a section/module have regularly the same tooth module.

Optionally the teeth will not be removed later, but a production takes place at which the planetary spindles are immediately or substantially immediately brought into that form as would occur as per the above described tooth removal from a conventional spindle.

For this it must at first be or may be commented how the teeth will occur at a conventional toothing. A common practice is the production by means of milling and grinding. For this the outline of the toothing will be defined and the milling tool moved along the outline. Thereby the milling tool is working relatively roughly. Therefore it is usual to add the finishing touches afterward, e.g. by grinding of the outside toothed parts or by honing or eroding of the internally toothed parts. Also transformative production procedures for gear parts are known, such as casting and sintering, and also forging, pressing, drawing, rolling, and stamping.

The milling process belongs to machining production. Other machining procedures are for example planing, pushing, stripping, shaving, grinding, and honing.

The common feature of these different methods is that they are following the fixed outline of the toothing. At conventional toothing a tooth alternates with a tooth space. The distance between two neighboring teeth of one part is the same.

The definition of the outline depends on the toothing. The toothing follows the general findings of the gear technology.

It is distinguished between different basic shapes of toothing: involute toothing as conventional toothing, cycloidal toothing and rack and pinion gearing. Moreover, there are existing diverse special forms.

For planetary roller extruders, the involute toothing is generally accepted. The involute toothing with full tooth trimming will be named in the following as conventional toothing.

At the involute toothing the flanks of the teeth of a toothed wheel are formed by involutes. One can imagine the involutes if one visualizes the basic circle of a toothed wheel as a massive cylinder around which a thread is wound. If the thread is now wound off, thus the tightly tensed final point of the thread describes the FIG. of an involute. Points on the thread which show the integer multiple distance of the final point are thus moving on the involute of another tooth. The involute toothings offer the following possibilities:

The flanks of two meshing toothed wheels are always or substantially always in contact and in these contact points they always or substantially always have approximately the same speed. Thus it is secured that the transfer of the rotational movement is effected with low friction.

Simultaneously or substantially simultaneously the involute toothing allows an even transfer of torques by a constant or substantially constant transmission.

It is non-sensitive with regard to the moving of the axes of the toothed wheels (distance independency).

It is simple to produce due to standardized straight-lined tools.

At the same geometry of the tool, toothed wheels with a different number of teeth and different profile displacements are freely combinable.

Concerning planetary roller gears, one aims to work with the lowest possible clearance between the gear parts, also like with other gears. The clearance can be determined with respect to the outline. For planetary roller extruders a much greater clearance is intended. Also, this clearance can be determined with respect to the tooth outline.

For a conventional toothing, one tooth is following one tooth space and a tooth space is following a tooth, whereat teeth and tooth spaces are equal. As the teeth mesh into the tooth spaces and the cogging/intermeshing gear parts shall have the same toothing, the tooth spaces comprise a mirror-inverted picture of the teeth.

For the design of the toothing as per the present application, the tooth spaces are different from the conventional toothing. For the above described production of the toothing as per the present application, individual or several teeth will be removed from the existing gear parts. Individual or several teeth will already be removed alternatively at determination of the tooth outline. The production then follows the above described way of the determined tooth outline as per the present application. That means, in case of application of a milling tool, the milling tool follows the previously specified new outline with larger tooth spaces. The same applies to other tools for the production of the previously specified new outline.

It will be favorable when the number of teeth of the internal toothing of the housing (liner toothing), of the planetary spindles and central spindle is chosen in that way that the number of teeth at the central spindle and at the internal toothing of the housing (liner toothing) is even and the number of teeth at the planetary spindles is uneven. Then the melt being in every tooth space between two teeth will be displaced by the teeth of other planetary roller extruder parts which are entering the clear space.

The same relations are resulting from uneven numbers of teeth at central spindle and internal toothing of the housing and from even number of teeth at the planetary spindles.

The same result can be achieved by irregular removal of the teeth trimming during the production of the transport spindles, for example thereby that not regularly every second tooth will be removed but once or several times another tooth, e.g. the third tooth or for example two teeth staying originally side by side will remain untouched. That means the processing is executed in different distances. Thereby it may be sufficient that one distance differs from the other distances. There may be also several different distances.

The same result can also be achieved thereby that planetary spindles processed as per the present application will be combined with unmachined planetary spindles or that planetary spindles differently processed as per the present application will be combined with each other.

The transport spindles and the respective state of the art are known.

To each planetary roller extruder belongs a maximum planetary spindle trimming. Thereby the maximum number of planetary spindles is concerned which will have room between the internal toothing of the surrounding housing and the central spindle without hindering each other at a rotation.

The maximum planetary spindle trimming depends on the respective toothing module. While the planetary roller extruder module is an extruder section, the toothing module is a parameter for calculation/construction size destining the shape of the teeth and the tooth spaces.

Due to the choice of a minor planetary spindle trimming compared with the maximum planetary spindle trimming can occur, in addition to the application of transport spindles as per the present application, a reduction of the energy input into the material. In one possible embodiment, a reduction of the number of planetary spindles by at least one, optionally by at least two or at least three is scheduled compared with the maximum planetary spindle trimming.

Optionally also segmented planetary spindled are intended, namely with a separate part being processed as per the present application and with a separately produced remaining part. The remaining part can be a nap toothed part or a conventionally toothed part or another part. Both parts are equipped with a central boring for an anchor by which both parts will be tensed up with each other. In this way arise segmented planetary spindles having a toothing change over their length, i.e. change from a toothing as per the present application to another toothing.

The multi-section may have possibilities during the production of the toothing as the parts with different toothing are produced separately. Then the tools must not or should not follow the tooth change. In connection with a requested abrupt change of the toothing such a proceeding will be possible.

On the other hand, a slow change from one toothing to the other may be procedurally possible. A slow transition from an above described toothing to a conventional toothing occurs when using a milling tool, e.g., thereby that the milling tool used for the later removal of the tooth will be slowly moved out of the material of the planetary spindle.

The segmented planetary spindles can also have a multiple change of toothing.

Also, one-piece planetary spindles are considered which show over their length one or several changes of toothing.

For each change of the toothing, the explanation regarding the later removal of teeth and the previous determination of the tooth outline are accordingly valid.

A degassing may become necessary and/or desired, depending on the extrusion material.

Optionally, the supply as per the present application is applied also in combination with a further processing of the extrusion material in a single-screw extruder or a twins-screw extruder.

In the combination with a single-screw extruder the central screw continues as single-screw in the extruder section which follows the supply.

In combination with a twin-screw extruder the central spindle continues in the supply as one of the two screws of the twin-screw extruder.

Moreover, it is possible if the housing shows a rounding at the changeover of the inlet opening into the toothing of the housing. In one possible embodiment, the rounding has thereby a radius which is at least equal one-fourth of the tooth height, and in another possible embodiment at least equal one-half of the tooth height of the toothing of the housing.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIG. 2 shows further planetary spindles;

FIG. 3 shows schematic conventional planetary spindles for planetary roller extruders;

FIG. 4 shows the known planetary spindles which have on the one hand the same screw flights as the screws/spindles as per FIG. 3;

FIG. 6 shows a planetary spindle in the drying station of an EPDM compounding line;

FIG. 7 shows a distribution of teeth;

FIG. 8 shows a planetary spindle in the drying station of an EPDM compounding line;

FIG. 9 shows a planetary spindle;

FIG. 10 shows a planetary spindle;

DESCRIPTION OF EMBODIMENT OR EMBODIMENTS

Figure 1:
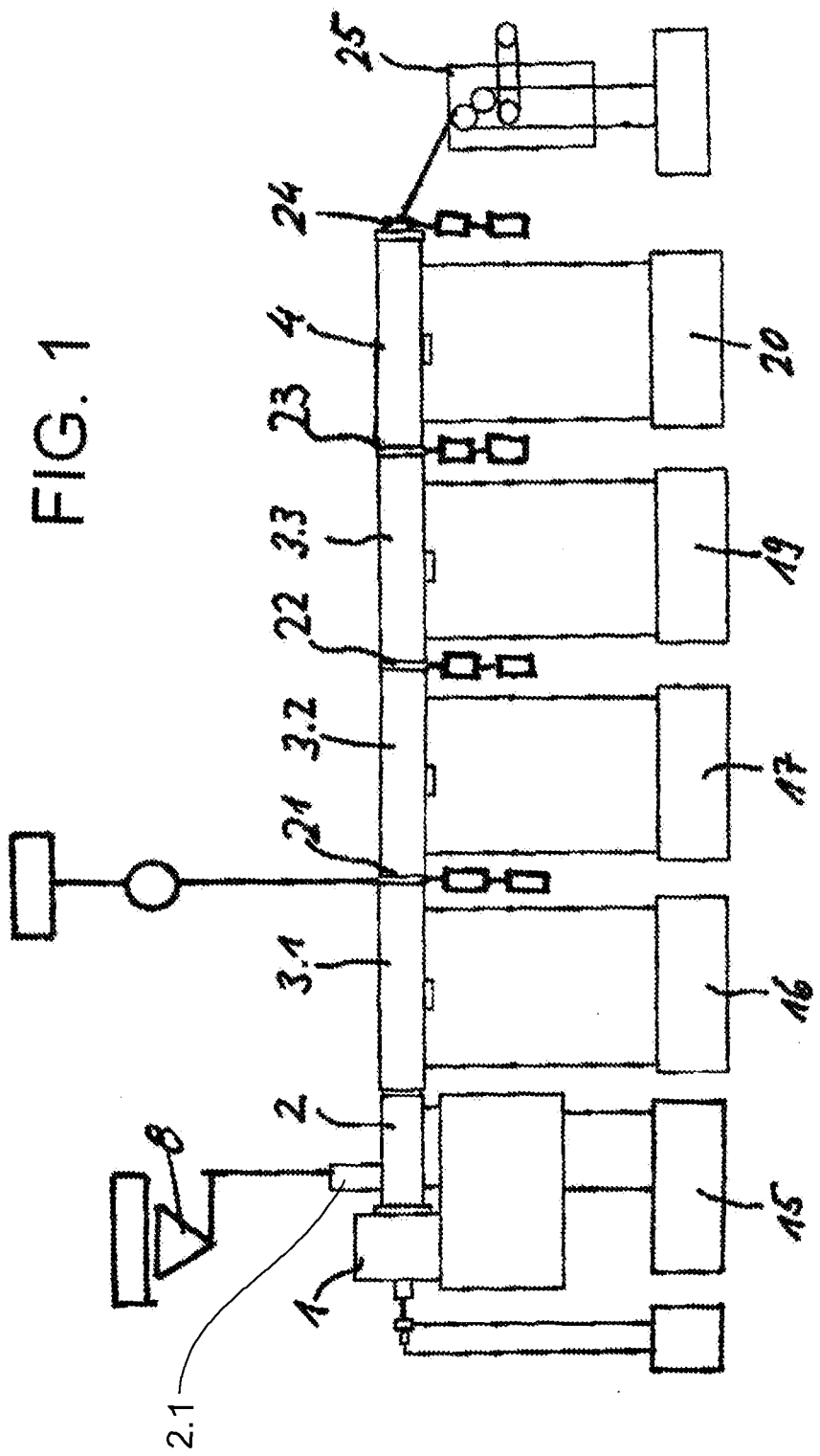
FIG. 1 shows an extruder according to the present application.

In the drawings there are depicted different execution examples of the present application.

FIG. 1 shows an extruder with the following components/sections: drive 1, feed 2 with feed guide 2.1, planetary roller extruder sections 3.1, 3.2 and 3.3, 4 and round, discharge die 24.

A dosing 8 ends in the feed 2. From the container of the dosing 8 leads a dosing line into the feed 2.

The dosing will be filled with thermoplastic EPDM granulate for its processing and then closed (not shown).

The EPDM granulate gets into the feed 2 and is conveyed from there in an extrusion direction. In the drawing, the extrusion direction points from the left to the right. The feed 2 is designed in a building-block design. This module is designed as a planetary roller extruder.

In the feed 2 a first heating takes place. For the heating of the EPDM granulate a heating-cooling circuit 15 is intended. The heating-cooling circuits acts together with the housing shell of the module. Via the housing shell the heat is transferred onto the EPDM granulate filled into the feed part 2. Additionally the screw rotating in the feed part 2 creates a heating of the EPDM granulate.

In the execution example the EPDM granulate arrives with a preheating temperature of 140 degrees Celsius in the next extruder section/module 3.1. The extruder sections/modules 3.2 and 3.3, 4 follow the extruder section/module 3.1. The modules 3.1 to 4 are designed as planetary roller extruders. The modules 2, 3.1, 3.2 and 3.3, 4 have coordinated housings and non-depicted connection flanges at which they are connected with each other. The connection is a screw connection.

In the planetary roller extruder sections/modules 3.1, 3.2 and 3.3, 4 the EPDM granulate will be kneaded very often between the rotating planetary spindles, the central spindle and the internally toothed extruder housing so that always or substantially always new surfaces are available which can be used for the heat transfer.

Heat can be transferred from the housing shell onto the EPDM or drawn off of the EPDM and discharged via the housing shell.

Like in module 2, the modules 3.1, 3.2 and 3.3 as well as 4 are equipped with heating-cooling circuits 16, 17, 19, 20.

In the extruder sections/modules 3.1, 3.2 and 3.3 the EPDM is heated up to a temperature of 300 degrees Celsius, while in extruder section/module 4 the EPDM is heated to a temperature of 220 degree Celsius. The heating-cooling circuits 16, 17, 19, 20 secure the maintenance of the requested temperature. Thereby, due to the deformation work of the extruder sections/modules, heat will be applied into the EPDM. If the application of heat is insufficient for the achievement of the requested temperature, the missing heat will be transferred onto the EPDM from the heating-cooling circuits via the respective housing shells of the modules. If the heat quantity created by the deformation work exceeds the requested temperature for the necessary and/or desired heat quantity, the surplus quantity will be drawn-off via the heating-cooling circuits.

The EPDM will be molten in the extruder sections. Simultaneously or substantially simultaneously the molecular chains will be cross-linked with each other. The achieved and maintained temperature profile complies with the specifications of the EPDM producer.

In other examples of use, another temperature can be adjusted and maintained.

Additionally, there is intended in the execution example an oil addition for the processing of the EPDM. The oil addition takes place via the injection ring 21. The injection ring 21 is located between the modules 3.1 and 3.2. The injection ring 21 is connected with a pump and an oil container via a feed line.

In the execution example, the injection ring 21 forms the stop ring for the rotating planetary spindles of module 3.1.

Moreover, openings are located at the injection ring 21 in which pressure measuring devices and temperature measuring devices are located. These devices are integrated into the control system of the heating-cooling circuits.

The details of the injection ring 21 and its alignment in the housing are known.

Also at the modules 3.2 and 3.3, stop rings 22 and 23 are located, by means of which pressure measurements and temperature measurements can be executed like at module 3.1.

The EPDM will be discharged out of the extrusion line with a temperature of 220 degrees Celsius. Therefore module 4 is equipped at the outlet side with a round die 24 of 20 millimeter diameter. The discharged EPDM will be cooled down between cooling rolls 25.

Figure 1A:
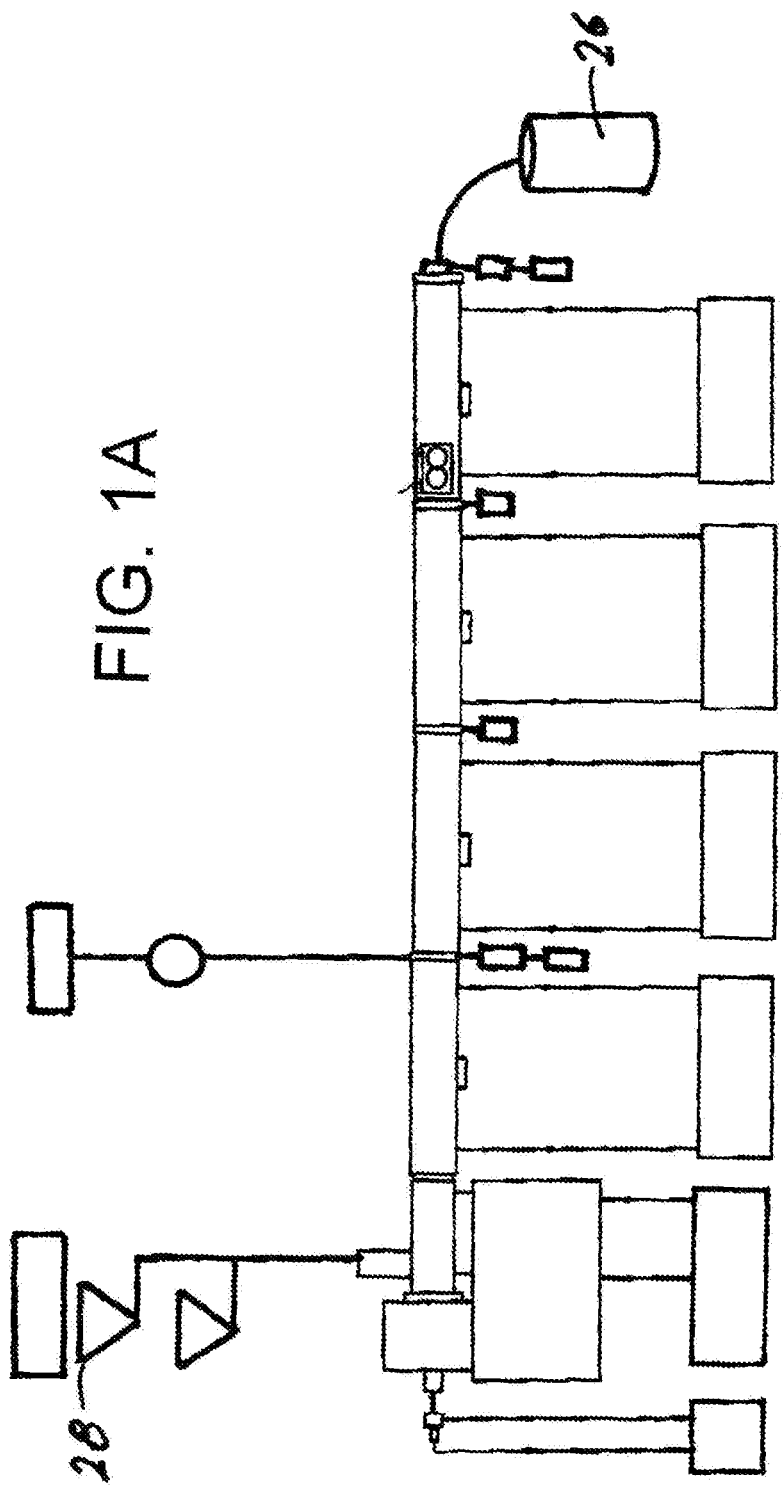
FIG. 1A shows an execution example.

The execution sample as per FIG. 1A differs from the execution example as per FIG. 1 by another cooling at the discharge. In the execution example, the cooling for the EPDM comprises a simple water container 26.

Figure 5:
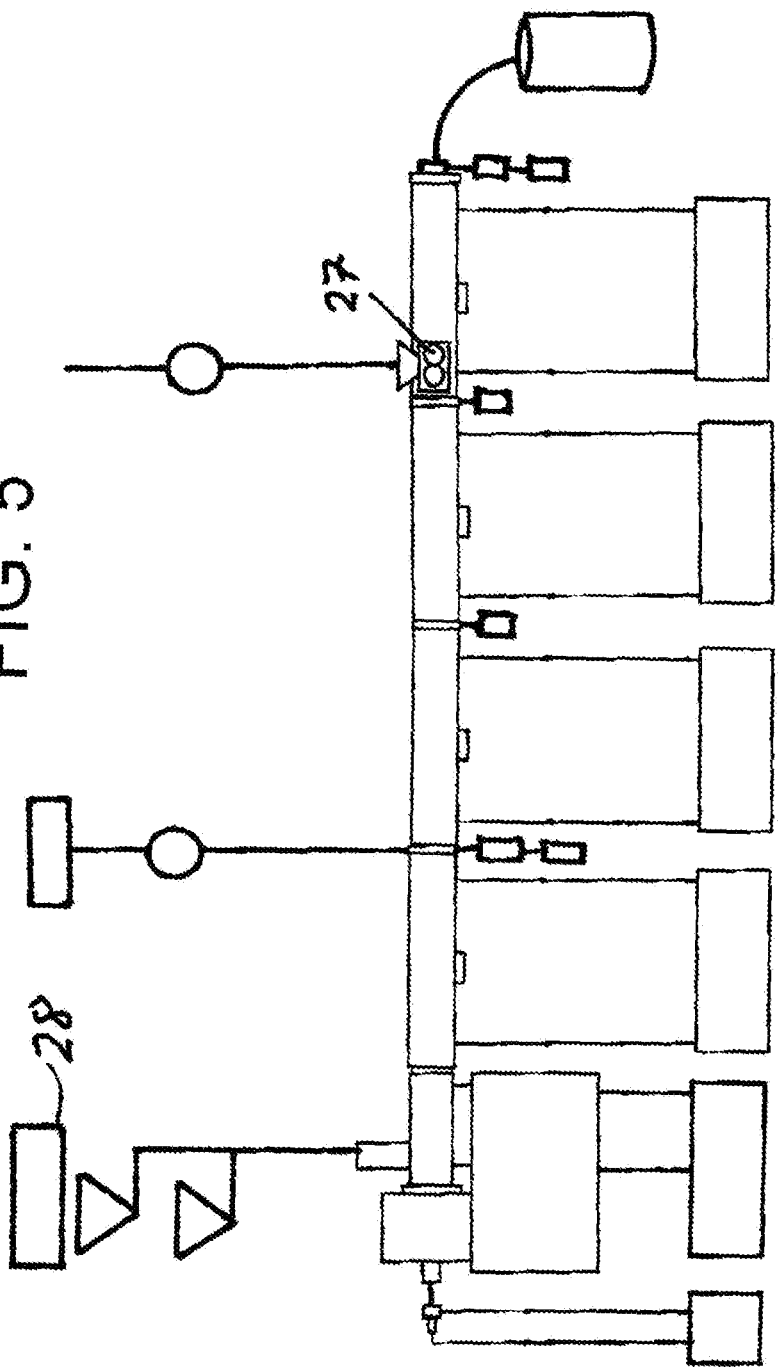
FIG. 5 shows another execution example.

The execution example as per FIG. 5 differs from the execution example as per FIG. 1A by a degassing unit 27 and by an additional dosing 28.

The degassing unit 27 comprises a laterally flanged twin-screw extruder by which the melt discharge can be avoided and/or minimized, but a gas release is allowed. The gas release is effected by an ID fan lying against the twin-screw extruder.

The additional dosing 28 serves for the admixing of a further polymer into the EPDM.

FIG. 3 shows in a schematic view conventional planetary spindles 321 for planetary roller extruders. These planetary spindles 321 form multiple thread screws that extend with a constant or substantially constant inclination over the whole spindle length.

In the drawing, the screw flights are depicted by lines running diagonal to the longitudinal axis of the spindle.

The screw flights are running in the side view from the right right-handed in clockwise directions. The screws have a toothing on the outside. The corresponding mirror-inverted toothing is arranged at the central spindle of the planetary roller extruder section and the internally toothed surrounding housing, so that the planetary spindles 321 can cog with the toothing of the housing as well as with the central spindle.

FIG. 4 shows the known planetary spindles 322 which have on the one hand the same screw flights as the screws/spindles as per FIG. 3. On the other hand, the spindles have at the same time left-handed running slots which are crossing the right-handed running screw flights. In FIG. 4 the left-handed running slots are depicted by lines which cross rectangularly the screw flights known from FIG. 3. This is depicted by crossing lines. The lands between the screw flights, which in the cross section form the teeth of the toothing, will be interrupted by the crossing slots. The teeth remaining between two interruptions form a barb-like/nap-like tooth.

The many barbs/naps arising side by side are why this toothing is called a "nap toothing." The interruptions are designated in the following as tooth spaces.

FIG. 2 shows further planetary spindles 23 with a part 25, which is designed according to the toothing as per FIG. 3, and with a part 24, which is designed according to the toothing as per FIG. 4.

FIGS. 6 and 8 show, for the application of a planetary roller extruder in the drying station of an EPDM compounding line, a planetary spindle 60 as per the present application.

The planetary spindle 60 comprises two parts 61 and 62. The part 61 corresponds to a conventional planetary spindle with full tooth trimming. In the execution example, a planetary spindle has a pitch diameter of thirty-four millimeters and an outer diameter of forty-two millimeters and a diameter of twenty-six millimeters at the tooth root of the spindle trimming. In the execution example the part 61 has a length of 200 millimeters. The total length of the planetary spindle 60 amounts to 1000 millimeters.

This results in a length of 800 millimeters for the part 62. The part 62 defines the range of formation of the planetary spindle as per the present application, part 61 defines the remaining range. In part 61 the spindle 7 has 64 teeth which are running similar to the threads, but with a very high inclination at the outside. This is depicted in FIG. 8.

In part 62 there have been milled off three teeth 64. This has been effected before a hardening of the surface of the teeth 64. The distribution of the remaining teeth is depicted in FIG. 7. Thereby still two teeth 64 are lying side by side. With regard to the remaining teeth there is resulting a tooth space.

The planetary spindles as per FIG. 6 and FIG. 8 are called transport spindles, because they have, contrary to the nap spindles, a higher transport effect.

However, it also appears that the deformation work performed by the transport spindles is surprisingly low. The energy supply into the EPDM is accordingly low. This facilitates the maintenance of the temperature control which is necessary and/or desired for the EPDM.

In the execution samples as per 1, 1a and 5 an extruder is concerned with a housing diameter of seventy millimeters (referred to the pitch diameter of the internal housing toothing). The maximum number of spindles for the trimming of the modules 3.1, 3.2, 3.3 and 4 is seven. There are located in each module 6 planetary spindles each of the design shown in FIGS. 6 and 8 for the processing of EPDM.

In the other execution examples there can be different planetary spindles for the different modules. The differences can thereby refer to the number of "missing" teeth. The differences can also result from the combination of spindles of another type of construction. The differences can also result from the combination of spindles with different toothing at individual or at all or most planetary spindles. At least one planetary spindle designed as a transport spindle is included in the extrusion line.

FIG. 9 shows a planetary spindle with a conventional toothing 80 at one end, then a range 81 with a nap toothing, and then a range 82 with a reduced toothing as described above.

FIG. 10 shows a planetary spindle with a conventional toothing 85 at one end, then a range 86 with a nap toothing, then a range 87 with a reduced toothing, and again a conventional toothing 88 at the other end.

In the execution examples the length of the modules amounts to millimeters. The planetary spindles have a shorter length in the execution example, partly a different length.

Figure 11:
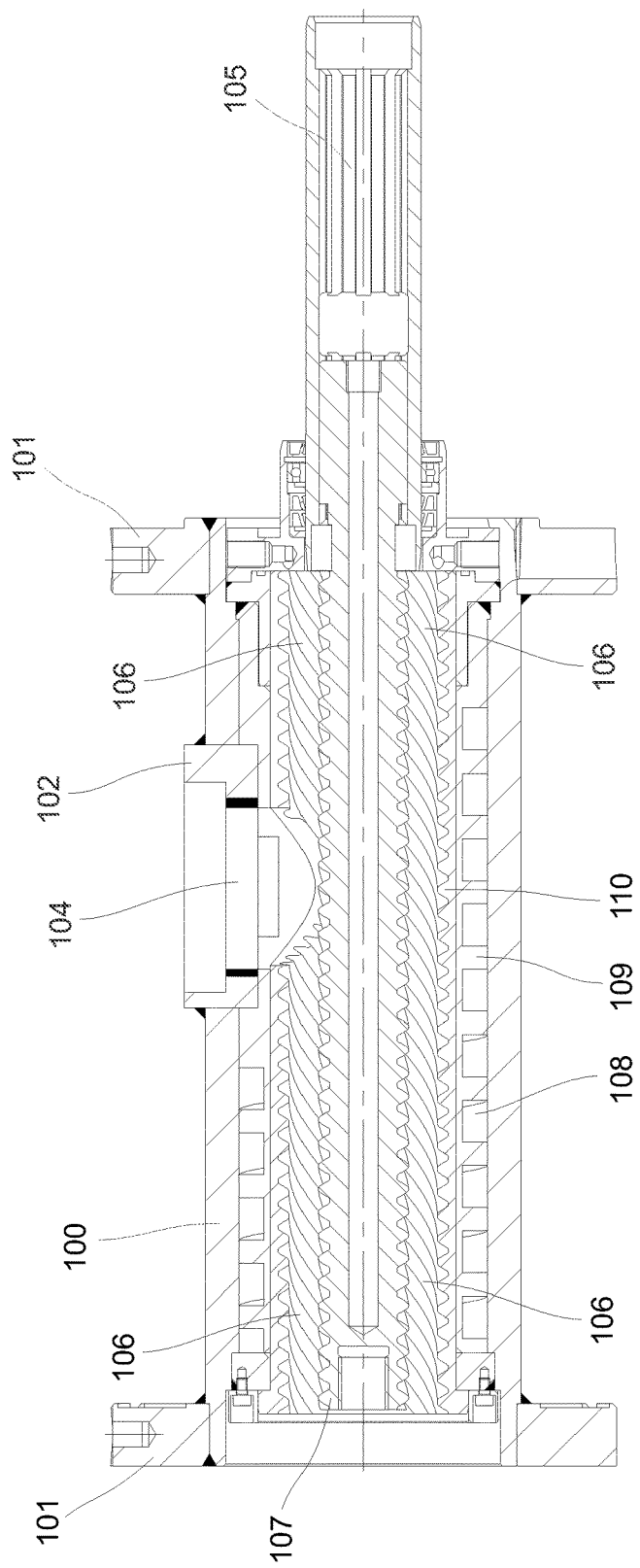
FIG. 11 shows a feed.
Figure 12:
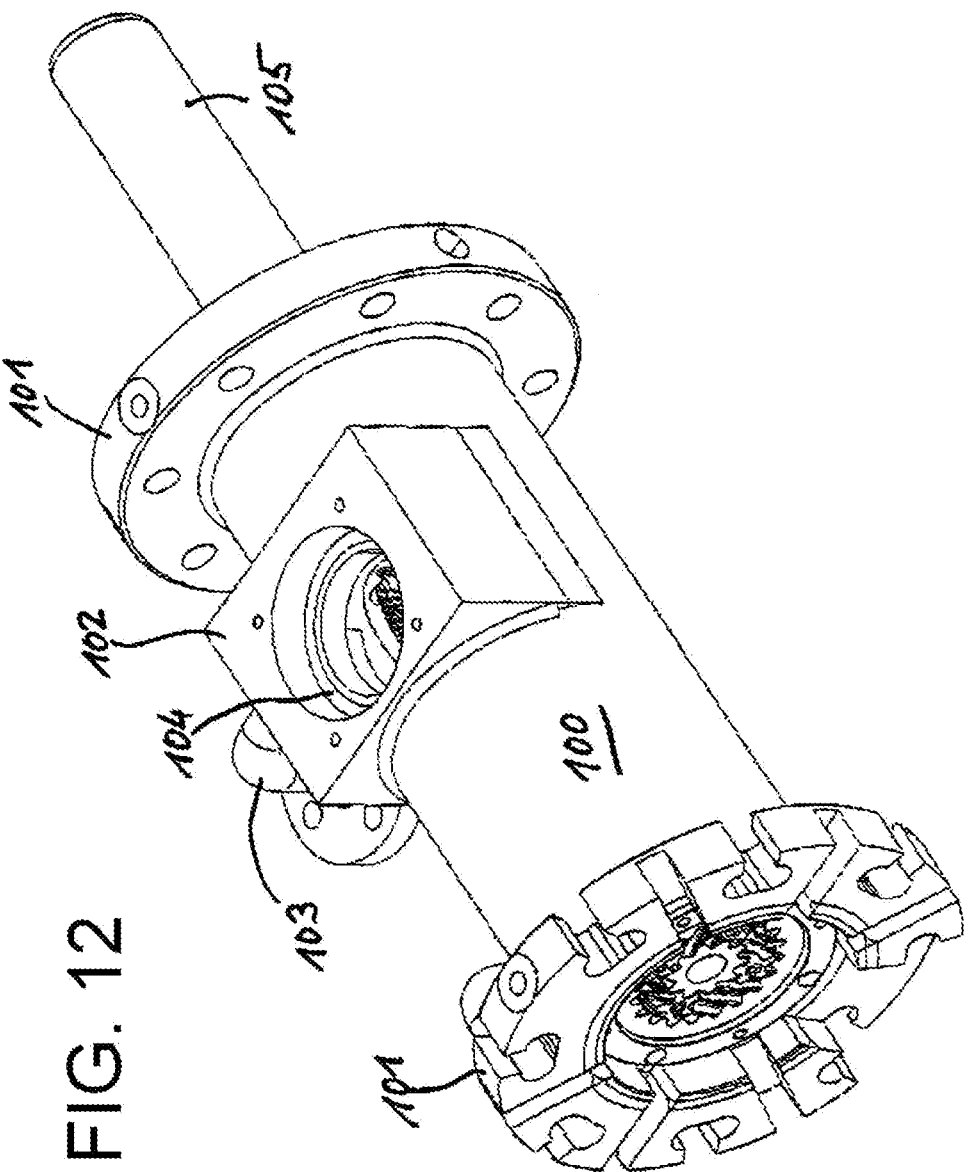
FIG. 12 also shows a feed.

As per FIGS. 11 and 12 the feed 2 is designed as a planetary roller extruder module.

To the planetary roller extruder module belongs a housing 100, which is equipped at each end with a flange 101. Moreover, the housing has a liner 109 which is equipped with an internal toothing 110. Outside there are introduced heating-cooling channels 108 into the liner. In the assembled state, the heating-cooling channels 108 are closed to the outside by the housing. At the ends of the heating-cooling channels 108 there are feed lines/discharge lines designed to receive a heating-cooling agent. In FIG. 12 there is depicted a connection 103 for the both feed lines/discharge lines.

Centric in the housing 100 there is arranged a central spindle 107. At the driving side the central spindle 107 is designed as a spline shaft 105 in order to correspond with a gear motor.

Between the internal toothing 110 and the central spindle 107 planetary spindles 106 can be located. The planetary spindles 106 are designed to cog or mesh with the toothing of the central spindle 107 and the internal toothing 110.

In the drawing the planetary spindles 106 show a normal/conventional toothing like the central spindle and the liner 109. Other than those depicted, however, transport spindles can be used.

Moreover, above on the housing 100 a flange 102 with an inlet opening 104 can be located for the material to be extruded. A feed hopper will be fixed at the flange 102.

Figure 13:
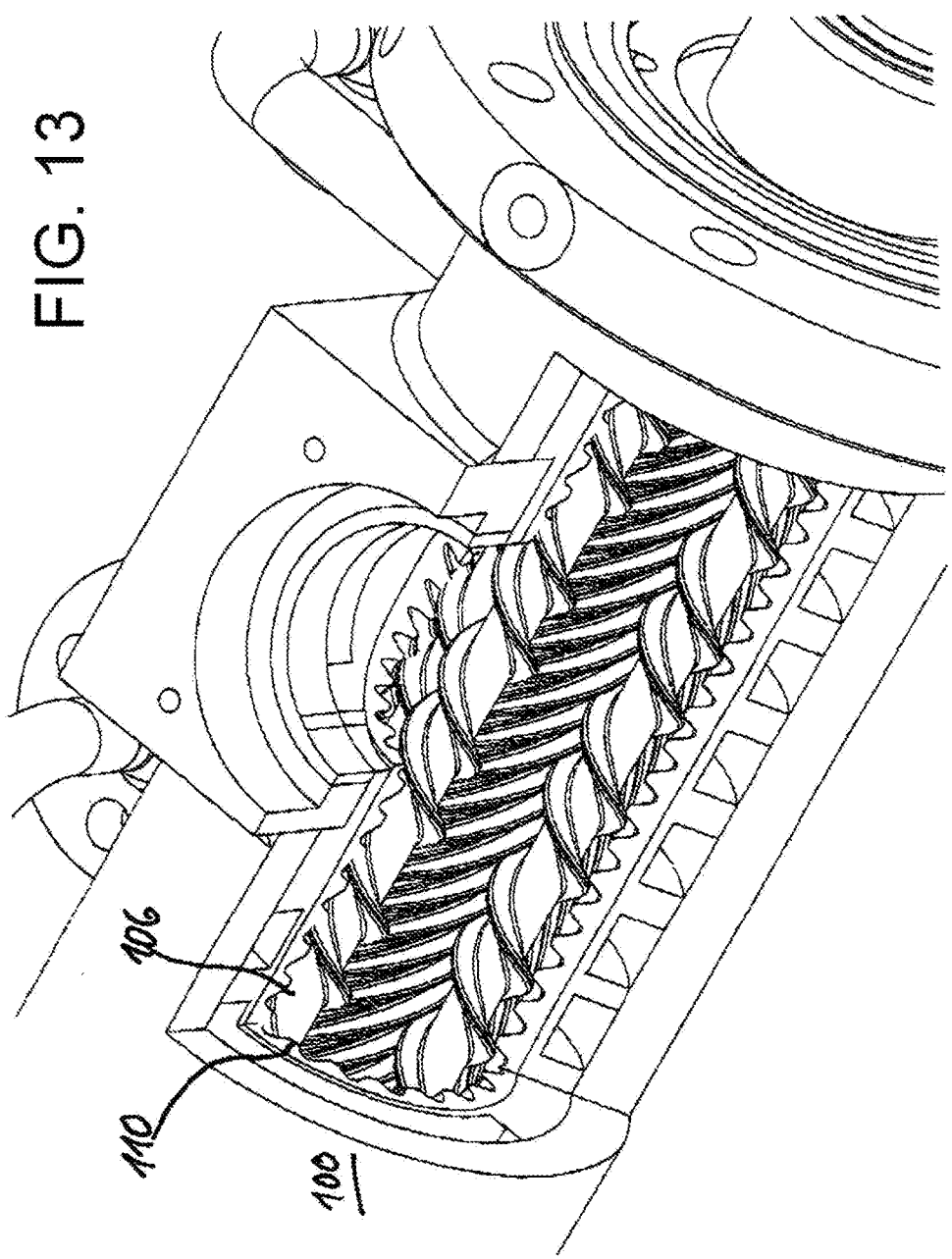
FIG. 13 shows the feed with an opened shell.

FIG. 13 shows the feed with an opened shell 100, so that there is a clear view to the transport spindles 106.

During operation, the extrusion material runs pressure-less out of the non-depicted feed hopper into the inlet opening 104 of the shell 100. Pressure-less means that, in excess of the weight of the column of material standing above the inlet opening 104, no pressure in the direction of the inlet opening will be carried out on the material.

The extrusion material gets between the transport spindles 106 and is cached by the transport spindles and brought extremely gently into the blend and conveyed in the direction of the other planetary roller extruder sections/modules in order to be processed further there.

Figure 14:
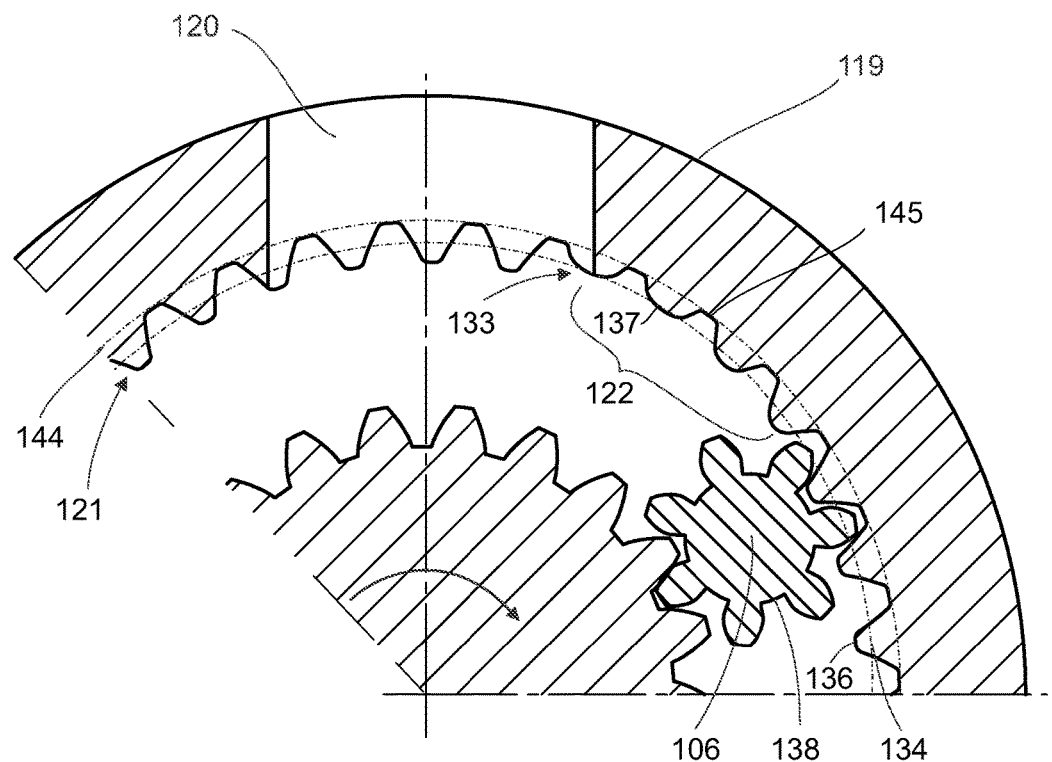
FIG. 14 shows yet another execution example.
Figure 15:
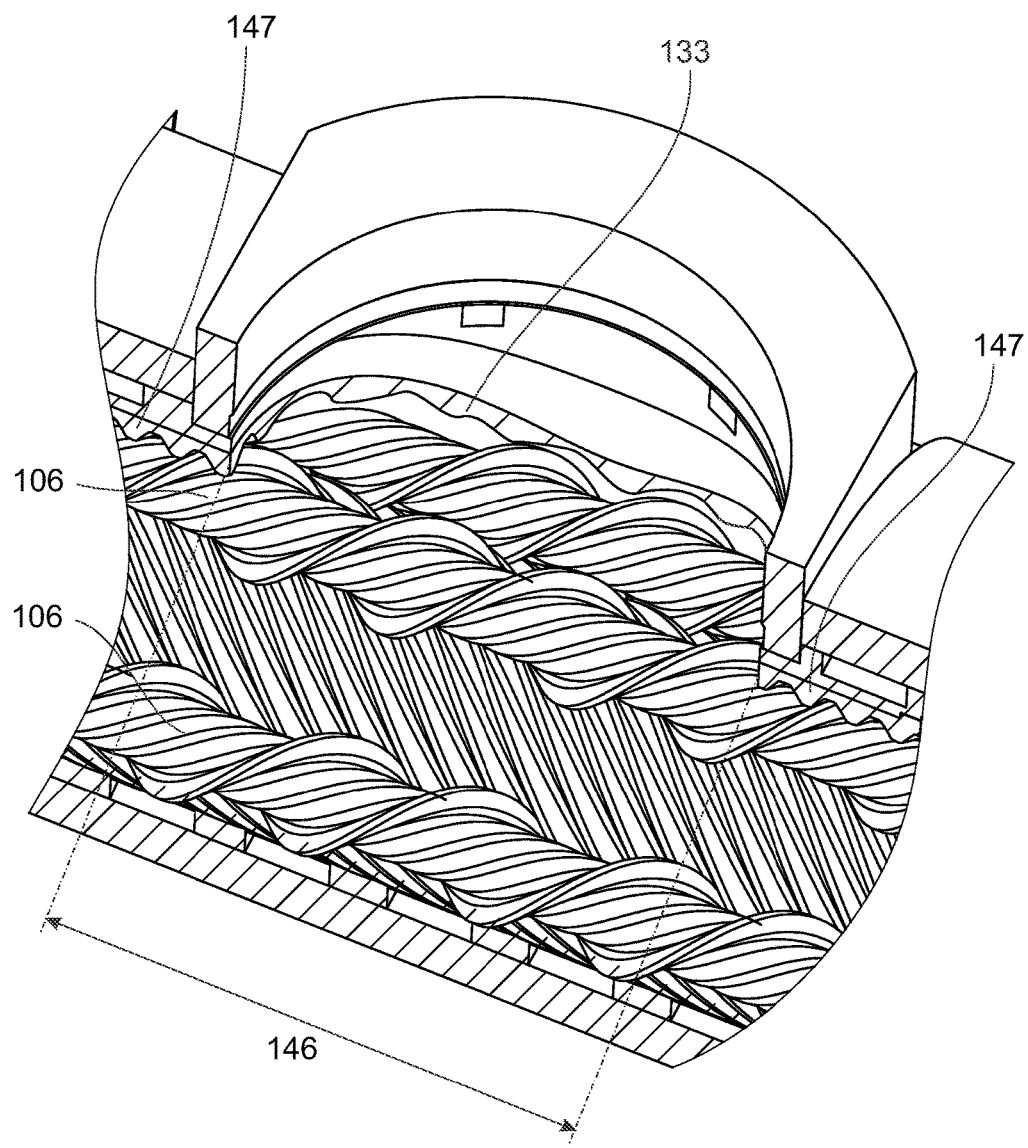
FIG. 15 shows still another execution example.

FIGS. 14 and 15 show a further execution example.

The further execution example differs from the execution example as per FIGS. 11 to 13 by another housing shell 119. The housing shell 119 also has an inlet opening 120 for the raw material. Furthermore, the housing shell 119 is equipped with an internal toothing which is suited like the internal toothing as per FIGS. 11 to 13 to work together with the planetary spindles 106. The internal toothing 121 is formed by a plurality of housing teeth 134 which extend axially along the housing and radially from a root 145 at a root circle inwardly to a top 136,137. Contrary to the internal toothing of the housing as per FIGS. 11 to 13, however, the internal toothing 121 as shown in FIG. 14 includes housing teeth with a flattened or shortened height portion 133 in an area 122 downstream of the inlet opening 120. The area 122 in which housing teeth are flattened or shortened extends circumferentially in the rotation direction of the central spindle. In the depiction as per FIG. 14 the rotation direction of the central spindle is clockwise. As shown, the radial distance from the root circle 144 to the tops 137 of the housing teeth at their shortened height portion 133 is shorter than the radial distance from the root circle 144 to the tops 136 of the housing teeth 134 at their regular height portion 147.

At the area 122 downstream of the inlet opening the shortened height portion 133 of the teeth are reduced in their height by three-fourths due to flattening. This flattening diminishes in the execution example in rotation direction of the central spindle. In the execution example the flattening ranges over one-tenth of the circumference of the pitch circle of the internal toothing of the housing. In other execution examples shortened teeth can be disposed over at least one-fourth of the circumference of the pitch circle or minimum one-half of the circumference of the pitch circle or minimum three-fourth of the circumference of the pitch circle. The area 122 within which housing teeth having a shortened height are disposed is axially aligned with the inlet opening 120. The inlet opening has a circular cross section.

The extension direction of the zone 122 runs in the depiction as per FIG. 14 in the rotation direction. In other execution examples the extension direction depicted in FIG. 14 can also run in the direction of the circumference and simultaneously or substantially simultaneously declined towards the longitudinal direction of the housing.

FIG. 15 shows that the shortened height portion 133 of the housing teeth extends axially in the execution example over the whole opening width 146 of the inlet opening. In other execution examples the shortened height portion 133 reaches at the utmost over ninety percent of the opening width 146 of the inlet opening, in still further execution examples at the utmost over eighty percent of the opening width 146 of the inlet opening and still other execution examples at the utmost over seventy percent of the opening width 146 of the inlet opening.

The axial extension of the shortened height portion 133 depicted in FIG. 15 can also exceed the opening width of the inlet opening, e.g. at the utmost by further ten percent of the opening width or at the utmost by further twenty percent of the opening width or at the utmost by thirty percent of the opening width.

The flattening depicted in FIGS. 14 and 15 forms a feed hopper which facilitates the feed of the raw material into the extrusion line.

Figure 16:
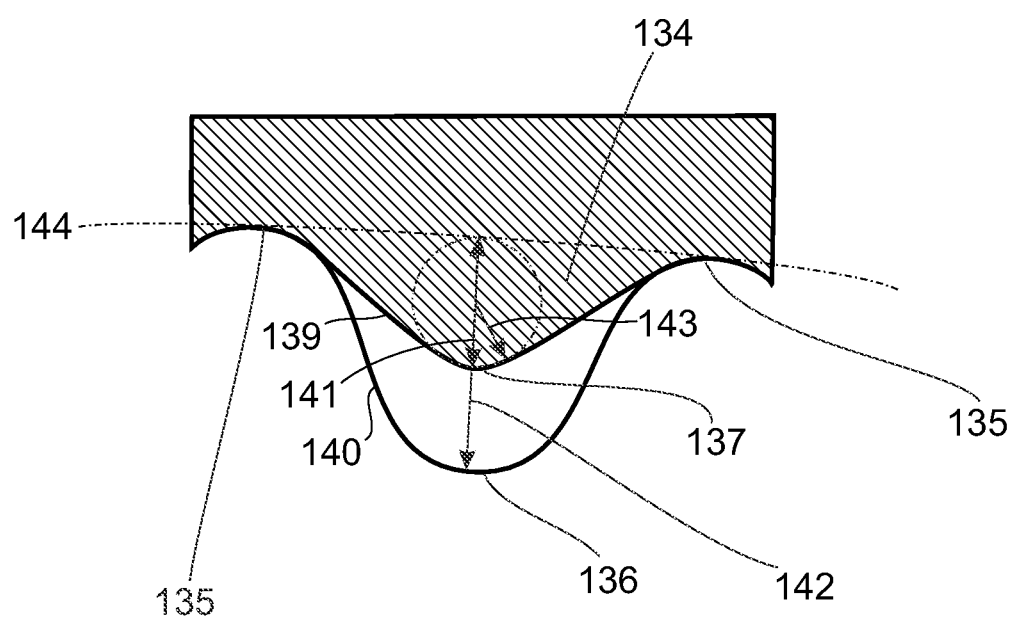
FIG. 16 shows an original tooth between the tooth spaces.

FIG. 16 shows a cross sectional view of a housing tooth 134 in the in the area downstream of the inlet opening. The tooth is shown cut at its shortened height portion 133. A shortened height 141 of the housing tooth 134 is defined by the radial distance from the root circle 144 to the tip 137 of the tooth 134. The tooth assumes its regular height 142 in an area away from the inlet opening. The top 137 of the shortened tooth is shown in front of the top 136 of the tooth 134 at its regular height 142. The tooth 134 extends radially inward between the roots 135 of the tooth 134. The depiction comprises a section of an internal toothing of a housing.

The top 137 of a tooth at its shortened height portion 133 proximal to the inlet opening may be formed by spark erosion. Proximal to the inlet opening flanks 139 of the shortened tooth show a minor inclination towards the pitch diameter of the internal toothing of the housing lesser than the tooth flanks 140 of the regular size tooth. As shown, the rounded top 137 of the shortened tooth has a radius 143 which is more than one-fourth of the tooth height 141.

As per the present application, a material supply for a pressure-less material inlet is designed as a planetary roller extruder section whereat whose planetary spindles are designed as transport spindles.

The following patents, patent publications, patent applications, and patent documents are incorporated herein except for the exceptions indicated herein: DE 19939075A1, CA 698518, DE19653790A, DE 19638094A1, DE 19548136A1, DE1954214A, DE3908415A, DE19939077A, EP1078968A1, EP1067352A, EP854178A1, JP3017176, JP11080690, JP9326731, JP11-216754, JP11-216764, JP10-235713, WO2007/0874465A2, WO2004/101627A1, WO2004/101626A1, WO 2004/037941A2, EP1056584, PCT/EP99/00968, WO 94/11175, U.S. Pat. No. 6,780, 271B1, U.S. Pat. No. 7,476,416, DE 102005007952A1, DE102004061068A1, DE102004038875A1, DE102004048794A1, DE102004048773A1, DE102004048440A1, DE102004046228A1, DE102004044086A1, DE102004044085A1, DE102004038774A1, DE102004034039A1, DE102004032694A1, DE102004026799B4, DE102004023085A1, DE102004004230A1, DE102004002159A1, DE19962886A1, DE19962883A1, DE19962859A1, DE19960494A1, DE19958398A1, DE19956803A1, DE19956802A1, DE19953796A1, DE19953793A1, DE69937111, DE69808332, DE19939078, DE19939077, DE19939076, DE19939075, DE19939074, DE19939073, 19824071, DE19806609, DE19730854, DE19638094, DE19819349, DE19749443, DE19653790, DE19548136, DE19534239, DE10334363, DE10137620, DE10059875, DE10050295, DE10036707, DE10036706, DE10036705, DE4308098, DE4111217, DE3908415, DE2719095, DE235613, DE2303366, DE1954214, EP1080865, EP1078968, EP1067352, EP0854178, U.S. Pat. No. 6,780,271, U.S. Pat. No. 6,179, 458, U.S. Pat. No. 5,536,462, U.S. Pat. No. 4,268,176, U.S. Pat. No. 4,176,967, WO2007/87465, WO2004/10162 WO2004/101627, WO2004/101626, WO2004/037941, WO94/11175, DE102007050466, DE102007041486, DE20003297, DE19930970, DE, DE102008058048, DE102007059299, DE102007049505, DE102006054204, DE102006033089, DE102004026799, DE19726415, DE10334363, DE10201000253, DE102009060881, DE102009060851, DE102009060813, DE60124269, DE 3738335, DD 141975, DE 1964834, U.S. Pat. No. 3,233, 025, DE 2059570, DE 2447368, EP 1167017, DE 69829695, U.S. Pat. No. 5,135,760, U.S. Pat. No. 5,045,325, U.S. Pat. No. 4,555,366, DE 102006033089A1, EP1844917A2, DE2702390A, EP1833101A1, DE10142890A1, U.S. Pat. No. 4,981,711, GB2175513A, U.S. Pat. No. 5,947,593, DE2719095, DE102004061185A1, DE102004060966A1, DE102004053929A1, DE102004005058, DE102004004237A1, DE69908565T2, DE69827497T2, DE69807708T2, DE69725985T2, DE69715781T2, DE69715082T2, DE69711597T2, DE69710878T2, DE69709015T2, DE69707763T2, DE69630762T2, DE69628188T2, DE69622375T2, DE69428309T2, DE69427539T2, DE69419146T2, DE69312852T2, DE69312246T2, DE69306874T2, DE69207369T2, DE68928567T2, DE68915788T3, DE60206271T2, DE60012108T2, DE19956483A1, DE19954313A1, DE10257377A1, DE10356821A1, DE10354546A1, DE10354379A1, DE10352444A1. DE10352440A1, DE10352439A1, DE10352432A1, DE10352431A1, DE10352430A1, DE10351463A1, DE10349144A1 DE10345043A1, DE10343964A1, DE10342822A1, DE1034097764, DE10340976B4, DE10333927A1, DE EP2098354, DE19856235.

One feature or aspect of an embodiment is believed at the time of the filing of this patent application to possibly reside broadly in extruders whereat the raw material will be supplied into the extruder via a feed part, whereat the material feed is formed by a planetary roller extruder section of a central spindle which rotates within a housing and planetary spindles, whereat the housing is internally toothed and surrounds the central spindle in a distance and the planetary spindles rotate around the central spindle in the clear spacing between the central spindle and the housing and are thereby cogging with the central spindle as well as also with the internal toothing of the housing, thereby marked that the planetary spindles in the inlet zone of the extrusion material are designed at least for a pressure-less material supply and are at least partly designed as transport spindles and/or that the internal toothing of the housing for the formation of the feed hopper is at least flattened in the toothing in that zone which is following the inlet opening of the housing shell and is extending to the rotation direction of the central spindle.

Another feature or aspect of an embodiment is believed at the time of the filing of this patent application to possibly reside broadly in extruders thereby marked that the inlet zone is the annular surface at the housing shell in which the opening for the material supply is lying, plus/minus a deviation of the annular surface width of fifty percent, in one possible embodiment of plus/minis thirty percent and in still another embodiment of plus/minus ten percent of a deviation of the annular surface width.

Yet another feature or aspect of an embodiment is believed at the time of the filing of this patent application to possibly reside broadly in extruders, marked by: a) the use of planetary spindles at which at least one tooth, but not all or most teeth have been removed later totally or partly and/or, b) the toothing which has been produced as per a defined tooth outline whereat the tooth outline is equal a toothing with teeth which have been removed later totally or partly.

Still another feature or aspect of an embodiment is believed at the time of the filing of this patent application to possibly reside broadly in extruders marked by the use of planetary spindles with at the utmost four remaining teeth, in one possible embodiment at the utmost three remaining teeth, in yet another possible embodiment at the utmost two remaining teeth and in still another possible embodiment one remaining tooth at the circumference of the planetary spindles.

A further feature or aspect of an embodiment is believed at the time of the filing of this patent application to possibly reside broadly in extruders, marked by the use of planetary spindles which either have an even number of teeth in the range of the reduced tooth trimming whereas to toothing at the corresponding planetary roller part has an uneven number of teeth; or have an uneven number of teeth in the range of the reduced tooth trimming, whereas the toothing at the corresponding planetary roller part has an even number of teeth.

Another feature or aspect of an embodiment is believed at the time of the filing of this patent application to possibly reside broadly in extruders marked thereby that the planetary spindles are equipped with another toothing outside of the inlet zone.

Yet another feature or aspect of an embodiment is believed at the time of the filing of this patent application to possibly reside broadly in extruders, marked thereby that the other toothing is a conventional toothing and/or a hedgehog toothing and/or a nap toothing.

Still another feature or aspect of an embodiment is believed at the time of the filing of this patent application to possibly reside broadly in extruders, marked by the use of one-piece or segmented planetary spindles and/or central spindles and/or toothings of the housings.

A further feature or aspect of an embodiment is believed at the time of the filing of this patent application to possibly reside broadly in extruders, thereby marked that the portion of planetary spindles with transport spindle toothing amounts to at least fifty percent, in one possible embodiment at least seventy percent and still a further possible embodiment at least ninety percent of the spindle trimming of the planetary roller extruder section forming the feed.

Another feature or aspect of an embodiment is believed at the time of the filing of this patent application to possibly reside broadly in extruders, marked thereby that the planetary spindles with transport spindle toothing are distributed evenly in the planetary spindle trimming.

Yet another feature or aspect of an embodiment is believed at the time of the filing of this patent application to possibly reside broadly in extruders, thereby marked that the number of teeth in the planetary spindle trimming in chosen in that way that within ten rotations, in one possible embodiment at least within seven rotations and still in a further possible embodiment at least within four rotations and in yet another possible embodiment at every rotation of the planetary spindles around the central spindle one planetary tooth meshes every tooth space of the toothing of the central spindle and every tooth space of the internal toothing of the housing.

Still another feature or aspect of an embodiment is believed at the time of the filing of this patent application to possibly reside broadly in extruders thereby marked that the teeth of the internal toothing of the housing in the range forming a hopper are flattened maximum till the tooth ground, in one possible embodiment have been flattened by maximum ninety percent of the original tooth height, in another possible embodiment have been flattened by maximum eighty percent of the original tooth height.

A further feature or aspect of an embodiment is believed at the time of the filing of this patent application to possibly reside broadly in extruders marked thereby that the flattening diminishes with increasing distance from the inlet opening.

One feature or aspect of an embodiment is believed at the time of the filing of this patent application to possibly reside broadly in extruders marked thereby that the flattening reaches over minimum one-tenth, in one possible embodiment over minimum one-fifth, in another possible embodiment over minimum one-half and in yet another possible embodiment over minimum three-fourths of the circumference of the pitch circle on the internal toothing of the housing.

Another feature or aspect of an embodiment is believed at the time of the filing of this patent application to possibly reside broadly in extruders thereby marked that the zone of the flattening of the internal toothing of the housing has a width being at the utmost equal seventy percent of opening width of the inlet opening, in one possible embodiment at the utmost equal eighty percent of the opening width, in another possible embodiment at the utmost equal ninety percent of the opening width and in another possible embodiment at the utmost equal the opening width of the inlet opening.

Yet another feature or aspect of an embodiment is believed at the time of the filing of this patent application to possibly reside broadly in extruders marked thereby that the flattened teeth are equipped with tooth flanks the inclination of which is smaller than the tooth flanks of the teeth in the non-flattened zone and/or the flattened teeth are equipped above with a rounding.

Still another feature or aspect of an embodiment is believed at the time of the filing of this patent application to possibly reside broadly in extruders thereby marked that the zone of the flattening of the internal toothing of the housing has a width which is at the utmost thirty percent larger than the opening width of the inlet opening, in another possible embodiment at the utmost twenty percent larger than the openings width of the inlet opening and in yet another possible embodiment at the utmost ten percent larger than the opening width of the inlet opening.

A further feature or aspect of an embodiment is believed at the time of the filing of this patent application to possibly reside broadly in extruders thereby marked that the flattened teeth, opposite to the original teeth, have tooth flanks which show towards the pitch circle of the internal toothing of the housing a lower inclination and end in a rounded tooth point.

Another feature or aspect of an embodiment is believed at the time of the filing of this patent application to possibly reside broadly in extruders thereby marked that at least the edge of the inlet opening at the changeover to the internal toothing of the housing shows a rounding whereat in one possible embodiment the radius of the rounding is at least equal one-fourth of the tooth height, in another possible embodiment at least equal one-half of the tooth height.

Yet another feature or aspect of an embodiment is believed at the time of the filing of this patent application to possibly reside broadly in extruders thereby marked that the feed part designed as planetary extruder roller section is equipped in a per se known manner with a heating-cooling, that the heating-cooling at least starts already at the inlet opening.

Still another feature or aspect of an embodiment is believed at the time of the filing of this patent application to possibly reside broadly in extruders marked by a length of smaller/equal two D of the feed part designed as planetary roller extruder section, whereat the dimension is referring to the distance of the end of the inlet pointing in conveying direction and whereat D is the pitch diameter of the internal toothing of the housing.

A further feature or aspect of an embodiment is believed at the time of the filing of this patent application to possibly reside broadly in extruders marked by a length of larger two D of the feed part designed as planetary roller extruder section whereat the dimension is referring to the distance of the end of the inlet pointing into conveying direction and whereat D is the pitch diameter of the internal toothing of the housing, and thereby marked that the heating-cooling comprises minimum two sections of which the section at the inlet side has a length of smaller/equal one-half D, whereat D is the pitch diameter of the internal toothing of the housing.

One feature or aspect of an embodiment is believed at the time of the filing of this patent application to possibly reside broadly in extruders, thereby marked that the center axis of the inlet opening is crosses as secant the pitch diameter of the internal toothing of the housing or follows as tangent the pitch circle of the internal toothing of the housing or follows in a distance of the pitch circle of the internal toothing of the housing whereat the distance is at the utmost equal the thickness of the housing shell.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

All of the patents, patent applications, patent publications, and other documents, except for the exceptions indicated herein, which were cited in the International Search Report dated Jul. 24, 2014, and/or cited elsewhere, as well as the International Search Report document itself, are hereby incorporated by reference as if set forth in their entirety herein except for the exceptions indicated herein, as follows: EP 2 098 654, having the title "Heating or cooling ceiling with corrugated steel sheet," published on Sep. 9, 2009; DE 198 56 235, having the title "Extrusion line for plastics, foodstuffs and other extrudable materials uses a back venting system," published on May 31, 2000; DE 39 37 612, having the title "Planetary extruder screw arrangement for PVC—having tapered outlet ends of planetary screw spindles and have domed supporting pivot having bevelled edge inlet end," published on Aug. 30, 1990; DE 10 2010 026535, having the title "Planetary roller extruder module for use in extrusion equipment, for processing plastics, has housing set together between flanges along axial direction from pieces, where housing is releasably held together with tie rods," published on Jan. 12, 2012; DE 88 12 244, to Applicant ENTEX RUST & MITSCHKE GMBH, published on Feb. 23, 1989; GB 2 175 513, having the title "An apparatus for homogenising and working ingredients for food- and feed-stuffs such as dough," published on Dec. 3, 1986; and DE 195 08 125, having the title "Induction cylinder for planet roller extruder," published on Feb. 29, 1996.

The corresponding foreign and international patent publication applications, namely, Federal Republic of Germany Patent Application No. 10 2012 019 727.6, filed on Oct. 11, 2012, having inventor Harald RUST, and DE-OS 10 2012 019 727.6 and DE-PS 10 2012 019 727.6, and International Application No. PCT/EP2013/000132, filed on, having WIPO Publication No. WO 2014/056553 and inventor Harald RUST, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2013/000132 and German Patent Application 10 2012 019 727.6, is solely for the purposes of providing a basis of correction of any wording in the pages of the present application, which may have been mistranslated or misinterpreted by the translator, and to provide additional information relating to technical features of one or more embodiments, which information may not be completely disclosed in the wording in the pages of this application.

Statements made in the original foreign patent applications PCT/EP2013/000132 and DE 10 2012 019 727.6 from which this patent application claims priority which do not have to do with the correction of the translation in this patent application are not to be included in this patent application in the incorporation by reference.

Any statements about admissions of prior art in the original foreign patent applications PCT/EP2013/000132 and DE 10 2012 019 727.6 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A material extruder, comprising:
   a housing comprising an internal toothing formed by a plurality of housing teeth which extend along an axial extension of the housing, each housing tooth of the internal toothing extending radially from a root at a root circle inwardly to a top;
   a central spindle disposed within said housing;
   planetary spindles configured and disposed to rotate about said central spindle between said central spindle and said housing;
   each of said planetary spindles comprising an external toothing configured to mesh with said internal toothing of said housing;
   said housing comprising an inlet opening configured to permit feeding of material to be extruded into an interior of said housing; and
   a feed guide being disposed at said inlet opening to guide material to be extruded into said inlet opening,
   wherein at least one housing tooth extends axially along a regular height portion and a shortened height portion, and
   wherein a regular height of the at least one housing tooth, defined by a radial distance from the root circle to the top of the at least one housing tooth at the regular height portion, is greater than a shortened height of the least one housing tooth, defined by a radial distance from the root circle to the top of the at least one housing tooth at the shortened height portion.

2. The material extruder according to claim 1, wherein a plurality of shortened housing teeth each have a shortened height portion and a regular height portion, the plurality of shortened housing teeth including housing teeth which are disposed within a circumferential distance from said inlet opening along an interior circumference of said housing in a direction of rotation of said central spindle.

3. The material extruder according to claim 2, wherein the circumferential distance within which said plurality of shortened housing teeth extends along the interior of said housing in the direction of rotation of said central spindle is one of (C), (D), (E), and (F):
   (C) at least 10% of the interior circumference of said housing;
   (D) at least 20% of the interior circumference of said housing;
   (E) at least 50% of the interior circumference of said housing; and
   (F) at least 75% of the interior circumference of said housing.

4. The material extruder according to claim 1, wherein one of (A) and (B):
   (A) the shortened height is at most 10% of the regular height; and
   (B) the shortened height is at most 20% of the regular height.

5. The material extruder according to claim 1, wherein an axial extension of the shortened height portion is one of (G), (H), and (I):
   (G) in a range of 30% less to 30% greater than a width of said inlet opening;
   (H) in a range of 20% less to 20% greater than a width of said inlet opening; and
   (I) in a range of 10% less to 10% greater than a width of said inlet opening.

6. The material extruder according to claim 1, wherein flanks or sides of the at least one housing tooth have a lesser inclination along its shortened height portion, when viewed in cross section, than along its regular height portion.

7. The material extruder according to claim 1, wherein:
   the at least one housing tooth has a rounded top at the shortened height portion having a radius of curvature, when viewed in cross section, that is one of (J) and (K):
   (J) at least 25% of a height of the at least one housing tooth; and
   (K) at least 50% of a height of the least one housing tooth.

8. The material extruder according to claim 1, wherein said housing comprises heating and cooling channels disposed inside said housing.

9. The material extruder according to claim 8, wherein:
   said heating and cooling channels have a diameter that is less than or equal to half the diameter of a pitch circle of said internal toothing.

10. The material extruder according to claim 1, wherein each of said planetary spindles comprises a transport spindle or a transport spindle section having fewer planetary spindle teeth and/or greater space between adjacent planetary spindle teeth than another section of each of said planetary spindles and/or an additional set of planetary spindles in said material extruder.

11. The material extruder according to claim 10, wherein each of said transport spindles or said transport spindle sections comprises at least one fewer planetary spindle teeth than another section of each of said planetary spindles and/or said additional set of planetary spindles.

12. The material extruder according to claim 10, wherein each of said transport spindles or said transport spindle sections comprises one of (O), (P), (Q), and (R):
(O) four planetary spindle teeth;
(P) three planetary spindle teeth;
(Q) two planetary spindle teeth; and
(R) one planetary spindle tooth.

13. The material extruder according to claim 12, wherein one of (S) and (T):
(S) said transport spindles or said transport spindle sections comprise an even number of planetary spindle teeth; and
each of said internal toothing and said central spindle comprise an odd number of teeth; and
(T) said transport spindles or said transport spindle sections comprise an odd number of planetary spindle teeth; and
each of said internal toothing and said central spindle comprise an even number of teeth.

14. The material extruder according to claim 13, wherein each of said planetary spindles comprises said transport spindle section and another planetary spindle section which comprises a different type of toothing.

15. The material extruder according to claim 14, wherein said different type of toothing comprises teeth that are spaced apart at a different distance than said teeth of said transport spindle section, and/or have a different shape or cross-sectional profile.

16. The material extruder according to claim 15, wherein said transport spindle section extends over one of (U), (V), and (W):
(U) at least 50% of the length of each of said planetary spindles;
(V) at least 70% of the length of each of said planetary spindles; and
(W) at least 90% of the length of each of said planetary spindles.

17. The material extruder according to claim 16, wherein each of said planetary spindles is spaced apart from one another at the same interval.

18. The material extruder according to claim 17, wherein each of said transport spindle sections is configured such that at least one planetary tooth meshes with each space between the teeth of said internal toothing and with each space between the teeth of said central spindle, which meshing with each space occurs within one of (aa), (bb), (cc), and (dd):
(aa) ten rotations of the planetary spindles around the central spindle;
(bb) seven rotations of the planetary spindles around the central spindle;
(cc) four rotations of the planetary spindles around the central spindle; and
(dd) one rotation of the planetary spindles around the central spindle.

19. The material extruder according to claim 1, comprising a plurality of shortened housing teeth, each having a shortened height portion and a regular height portion, the shortened height portions being arranged downstream of the inlet opening.

20. The material extruder according to claim 19, wherein the internal toothing comprises a plurality of housing teeth, at least 10% of which have a shortened height portion.

21. The material extruder according to claim 19, wherein the shortened housing teeth each have a shortened height along their shortened height portions, and wherein the shortened heights of the shortened housing teeth which are circumferentially further from the inlet opening exceed the shortened heights of the shortened housing teeth which are circumferentially closer to the inlet opening.

22. The material extruder according to claim 1, wherein the shortened height portion of the at least one housing tooth is axially aligned with the inlet opening.

23. The material extruder according to claim 1, wherein an axial extension of the shortened height portion is at most 90% of a width of the inlet opening.

* * * * *